US010986789B1

(12) United States Patent
Roberts

(10) Patent No.: US 10,986,789 B1
(45) Date of Patent: Apr. 27, 2021

(54) SYSTEM AND METHOD FOR SENSOR-ASSISTED INDOOR GARDENING

(71) Applicant: Alarm.com Incorporated, Tysons, VA (US)

(72) Inventor: Aaron Lee Roberts, Centerville, VA (US)

(73) Assignee: Alarm.com Incorporated, Tysons, VA (US)

( * ) Notice: Subject to any disclaimer, the term of this patent is extended or adjusted under 35 U.S.C. 154(b) by 325 days.

(21) Appl. No.: 16/116,746

(22) Filed: Aug. 29, 2018

Related U.S. Application Data

(60) Provisional application No. 62/551,749, filed on Aug. 29, 2017.

(51) Int. Cl.
| *A01G 9/26* | (2006.01) |
| *A01G 9/24* | (2006.01) |
| *G06T 7/20* | (2017.01) |

(52) U.S. Cl.
CPC .............. *A01G 9/26* (2013.01); *A01G 9/241* (2013.01); *A01G 9/246* (2013.01); *G06T 7/20* (2013.01); *G06T 2207/20081* (2013.01); *G06T 2207/30188* (2013.01); *G06T 2207/30232* (2013.01)

(58) Field of Classification Search
CPC .......... A01G 9/24; A01G 9/241; A01G 9/242; A01G 9/243; A01G 9/245; A01G 9/246; A01G 9/247; A01G 9/249; A01G 9/26
USPC ....................................................... 47/1.1 R
See application file for complete search history.

(56) References Cited

U.S. PATENT DOCUMENTS

| 4,430,828 | A | * | 2/1984 | Oglevee | ................. | A01G 9/246 47/17 |
| 4,569,150 | A | * | 2/1986 | Carlson | .................... | A01G 9/18 47/17 |
| 4,630,221 | A | * | 12/1986 | Heckenbach | ........ | F24F 11/0009 165/223 |
| 4,856,227 | A | * | 8/1989 | Oglevee | ................. | A01G 9/247 47/17 |
| 4,858,377 | A | * | 8/1989 | Oglevee | ................. | A01G 9/247 47/17 |
| 4,916,642 | A | * | 4/1990 | Kaiser | ...................... | A01G 9/26 700/278 |
| 5,031,358 | A | * | 7/1991 | Sussman | ................. | A01G 9/246 47/58.1 R |

(Continued)

*Primary Examiner* — Ebony E Evans
(74) *Attorney, Agent, or Firm* — Fish & Richardson P.C.

(57) ABSTRACT

Methods, systems, and apparatus, includes computer programs encoded on a storage device, for sensor-assisted indoor gardening. In one aspect, a monitoring system is disclosed that includes a processor and a computer storage media storing instructions that, when executed by the processor, cause the processor to perform operations. The operations may include determining that a particular plant type is growing in a zone of a property, determining, based on sensor data generated by one or more sensors installed at the property, whether a current value of an environmental attribute of the zone of the property satisfies a threshold environmental value for the particular plant type, and performing, by the monitoring system, one or more operations configured to instruct a configurable device installed at the property to modify the current value of the environmental attribute of the zone of the property towards the threshold environmental value for the plant type.

24 Claims, 6 Drawing Sheets

(56) References Cited

U.S. PATENT DOCUMENTS

| | | | | |
|---|---|---|---|---|
| 5,566,069 | A * | 10/1996 | Clark, Jr. | G06F 3/033 |
| | | | | 702/2 |
| 7,617,057 | B2 * | 11/2009 | May | A01G 9/16 |
| | | | | 702/62 |
| 9,538,615 | B1 * | 1/2017 | Armstrong | G05B 15/02 |
| 2010/0076620 | A1 * | 3/2010 | Loebl | A01G 9/249 |
| | | | | 700/306 |
| 2015/0100168 | A1 | 4/2015 | Oliver et al. | |
| 2018/0026920 | A1 * | 1/2018 | Chen | H04L 51/26 |
| | | | | 455/466 |
| 2019/0124853 | A1 * | 5/2019 | Serizawa | A01B 79/005 |
| 2019/0278304 | A1 | 9/2019 | Grossman | |
| 2020/0005063 | A1 | 1/2020 | Ralls et al. | |
| 2020/0184153 | A1 * | 6/2020 | Bongartz | G06N 5/04 |

* cited by examiner

SYSTEM AND METHOD FOR SENSOR-ASSISTED INDOOR GARDENING

CROSS-REFERENCE TO RELATED APPLICATION

This application claims the benefit of U.S. Provisional Patent Application No. 62/551,749 filed Aug. 29, 2017 and entitled "System And Method For Sensor-Assisted Indoor Gardening," which is incorporated herein by reference in its entirety.

BACKGROUND

Growing organic produce can be an expensive, time-consuming process. The challenges to growing organic produce can increase when a legitimate property occupant attempts to maintain an organic garden inside a property. Growing an organic garden indoors can be challenging because, environmental conditions required to successfully establish and maintain an organic garden are not uniformly available inside a property. For example, air quality, temperature, humidity, and access to sunlight may vary greatly from one room of a property to the next.

SUMMARY

According to one innovative aspect of the present disclosure, a monitoring system for performing sensor-assisted indoor gardening is disclosed. The monitoring system may include one or more processors, and one or more computer storage media storing instructions that are operable, when executed by the one or more processors, to cause the one or more processors to perform operations. In some implementations, the operations may include determining, by the monitoring system, that a particular plant type is growing in a zone of a property, determining, by the monitoring system and based on sensor data generated by one or more sensors installed at the property, whether a current value of an environmental attribute of the zone of the property satisfies a threshold environmental value for the particular plant type, and in response to determining, by the monitoring system, that the current value of the environmental attribute of the zone of the property does not satisfy the threshold environmental value for the plant type, performing, by the monitoring system, one or more operations configured to instruct a configurable device installed at the property to modify the current value of the environmental attribute of the zone of the property towards the threshold environmental value for the plant type.

Other aspects include corresponding methods, apparatus, and computer programs to perform actions of methods defined by instructions encoded on computer storage devices.

These and other versions may optionally include one or more of the following features. For instance, in some implementations, the operations may further include receiving, by the monitoring system, data from a user of a user device that identifies a particular of plant and a particular zone of the property. In such implementations, determining, by the monitoring system, that a particular type of plant is growing in a zone of the property may include determining, by the monitoring system and based on the received data from the user of the user device, that a particular type of plant is growing in a zone of the property.

In some implementation the monitoring system may include a camera. In such implementations, determining, by the monitoring system, that a particular type of plant is growing in the zone of the property may include obtaining, by the monitoring system, an image of the zone of the property that was generated by the camera, and determining, by the monitoring system and based on the obtained image, that the zone of the property includes the particular plant type.

In some implementations, the one or more sensors may include a thermometer and the configurable device includes an HVAC unit. In such implementations, the operations may further include obtaining, by the monitoring system, a current temperature value for the zone of the property using the thermometer, and obtaining, by the monitoring system, a threshold environmental value for the particular plant type that describes a minimum temperature value that provides a suitable environment for growing the particular plant type. In such implementations, determining whether the current value of the environmental attribute of the zone of the property satisfies a threshold environmental value for the particular plant type may include determining, by the monitoring system, that the current temperature value for the zone of the property has fallen below the minimum temperature value and performing, by the monitoring system, one or more operations configured to modify the current value of the environmental attribute of the zone of the property towards the threshold environmental value for the particular plant type may include instructing, by the monitoring system, the HVAC unit to adjust the temperature of the zone of the property until the current temperature value of the zone of the property exceeds the minimum temperature.

In some implementations, the one or more sensors may include a thermometer and the configurable device include an HVAC unit. In such implementations, the operations may include obtaining, by the monitoring system, a current temperature value for the zone of the property using the thermometer and obtaining, by the monitoring system, a threshold environmental value for the particular plant type that describes a maximum temperature value that provide a suitable environment for growing the particular plant type. In such implementations, determining whether the current value of the environmental attribute of the zone of the property satisfies a threshold environmental value for the particular plant type may include determining, by the monitoring system, that the current temperature value for the zone of the property has exceeded the maximum temperature value and performing, by the monitoring system, one or more operations configured to modify the current value of the environmental attribute of the zone of the property towards the threshold environmental value for the particular plant type may include instructing, by the monitoring system, the HVAC unit to adjust the temperature of the zone of the property until the current temperature value of the zone of the property falls below the maximum temperature.

In some implementations, the one or more sensors may include a hygrometer and the configurable device may include a humidification unit. In such implementations, the operations may include obtaining, by the monitoring system, a current humidity value for the zone of the property using the hygrometer and obtaining, by the monitoring system, a threshold environmental value for the particular plant type that describes a minimum humidity value that provides a suitable environment for growing the particular plant type. In such implementations, determining whether the current value of the environmental attribute of the zone of the property satisfies a threshold environmental value for the particular plant type may include determining, by the monitoring system, that the current humidity value for the zone of the property has fallen below the minimum humidity value and performing, by the monitoring system, one or more operations configured to modify the current value of the environmental attribute of the zone of the property towards the threshold environmental value for the particular plant type may include instructing, by the monitoring system, the humidification unit to adjust the humidity of the zone of the property until the current humidity level exceeds the minimum humidity level.

In some implementations, the one or more sensors may include a hygrometer and the configurable device may include a de-humidification unit. In such implementations, the operations may further include obtaining, by the monitoring system, a current humidity value for the zone of the property using the hygrometer and obtaining, by the monitoring system, a threshold environmental value for the particular plant type that describes a maximum humidity value that provides a suitable environment for growing the particular plant type. In such implementations, determining whether the current value of the environmental attribute of the zone of the property satisfies a threshold environmental value for the particular plant type may include determining, by the monitoring system, that the current humidity value for the zone of the property has exceeded the maximum humidity value and performing, by the monitoring system, one or more operations configured to modify the current value of the environmental attribute of the zone of the property towards the threshold environmental value for the particular plant type may include instructing, by the monitoring system, the de-humidification unit to adjust the humidity of the zone of the property until the current humidity level falls below the maximum humidity level.

In some implementations, the one or more sensors may include a light sensor and the configurable device may include a set of connected blinds. In such implementations, the operations may further include obtaining, by the monitoring system, a current sunlight value for the zone of the property using the light sensor, wherein the sunlight value indicates a number of hours light has been detected in the zone and obtaining, by the monitoring system, a threshold environmental value for the particular plant type that describes a minimum number of hours of sunlight that provides a suitable environment for growing the particular plant type. In such implementations, determining whether the current value of the environmental attribute of the zone of the property satisfies a threshold environmental value for the particular plant type may include determining, by the monitoring system, that the current sunlight value for the zone of the property does not satisfy the minimum number of hours and performing, by the monitoring system, one or more operations configured to modify the current value of the environmental attribute of the zone of the property towards the threshold environmental value for the particular plant type may include instructing, by the monitoring system, the set of connected blinds to open for a predetermined amount of time to increase the number of hours the particular plant type is exposed to sunlight.

In some implementations, the one or more sensors may include a light sensor and the configurable device may include a set of connected blinds. In such implementations, the operations may further include obtaining, by the monitoring system, a current sunlight value for the zone of the property using the light sensor, wherein the sunlight value indicates a number of hours light has been detected in the zone and obtaining, by the monitoring system, a threshold environmental value for the particular plant type that describes a maximum number of hours of sunlight that provides a suitable environment for growing the particular plant type. In such implementations, determining whether the current value of the environmental attribute of the zone of the property satisfies a threshold environmental value for the particular plant type may include determining, by the monitoring system, that the current sunlight value for the zone of the property exceeds maximum number of hours and performing, by the monitoring system, one or more operations configured to modify the current value of the environmental attribute of the zone of the property towards the threshold environmental value for the particular plant type may include instructing, by the monitoring system, the set of connected blinds to close for a predetermined amount of time to reduce the number of hours the particular plant type is exposed to sunlight.

In some implementations, the one or more sensors may include a thermometer and the configurable device may include a set of connected blinds. In such implementations, the operations may further include obtaining, by the monitoring system, a current temperature value for the zone of the property using the thermometer and obtaining, by the monitoring system, a threshold environmental value for the particular plant type that describes a maximum temperature that provides a suitable environment for growing the particular plant type. In such implementations, determining whether the current value of the environmental attribute of the zone of the property satisfies a threshold environmental value for the plant may include determining, by the monitoring system, that the current temperature value for the zone of the property exceeds the maximum temperature value and performing, by the monitoring system, one or more operations configured to modify the current value of the environmental attribute of the zone of the property towards the threshold environmental value for the plant type may include instructing, by the monitoring system, the set of connected blinds to close to create a shaded environment.

According to another innovative aspect of the present disclosure, a monitoring system for performing sensor-assisted indoor gardening is disclosed. The monitoring system may include one or more processors and one or more computer storage media storing instructions that are operable, when executed by the one or more processors, to cause the one or more processors to perform operations. In some implementations, the monitoring system may include obtaining, by the monitoring system, first data describing a respective current value of an attribute for each property zone of a plurality of property zones from one or more monitoring system components installed at the property, obtaining, by the monitoring system, second data describing a respective value of a plant attribute for each of a plurality of plant types, determining, by the monitoring system and based on (i) the obtained first data describing the respective current value of the attribute for each property zone and (ii) the obtained second data describing the respective values of a plant attribute for each of the plurality of plant types, whether each of the property zones provide a suitable environment for growing one or more plants of the plurality of plants, and in response to a determination that a property zone of the property provides a suitable environment for growing one or more particular plants of the plurality of plants: generating a message, for transmission to a user device, that includes data identifying, for at least one property zone having an environment suitable for growing the one or more particular plants, (i) the one or more particular plants and (ii) the at least one property zone.

Other aspects include corresponding methods, apparatus, and computer programs to perform actions of methods defined by instructions encoded on computer storage devices.

These and other versions may optionally include one or more of the following features. For instance, in some implementations, the second data describing respective values of the plant attribute for each plant type of the plurality of plant types may include a threshold environmental value for each of the plurality of plant types, and the threshold environmental value may specify a maximum value, a minimal value, or range of values that must be satisfied for the plant type associated with the threshold environmental value to grow.

In some implementations, the plant attribute may include one of a temperature, a humidity, an air quality, or object movement.

In some implementations, the value of the plant attribute includes a temperature level, a temperature range, a humidity level, a humidity range, an air quality level, an air quality range, a level of movement permitted in a vicinity of the plant type, or a range of movement permitted in a vicinity of the plant type.

In some implementations, determining whether each of the property zones provide a suitable environment for growing one or more plants of the plurality of plants may include for each property zone of the plurality of property zones: determining, by the monitoring system for each plant type, whether the current value of the attribute for the property zone satisfies a threshold environmental value for the plant attribute that is defined by the value of the plant attribute.

In some implementations, determining whether each of the property zones provide a suitable environment for growing one or more plants of the plurality of plants may include for each property zone of the plurality of property zones: comparing, by the monitoring system, the current value of the attribute for the property zone to the value of the plant attribute for each of the plurality of plant types.

In some implementations, the generated message may include rendering data that, when rendered using a user device, generates a graphical user interface for output on the user device that identifies, for each property zone having an environment suitable for growing the one or more particular plants, (i) the one or more particular plants, and (ii) the property zone.

In some implementations, the generated message may include rendering data that, when rendered on the user device, generates a heat map overlay of a map of at least one of the property zones, wherein the rendered heat map includes color-shaded portions of the map of the property zone based on the suitability of each portion of the zone for growing the one or more particular plants.

In some implementations, the color-shaded portions of the rendered heat map may include a first color indicating portions of the at least one property zone that are suitable for growing the one or more particular plants and a second color indicating portions of the at least one property zone that are not as suitable for growing the one or more particular plants as the portions of the at least one property zone that are indicated by the first color.

In some implementations, the heat map may be provided for display in response to a user selection of a graphical element provided for display on the user device when the message is rendered.

DETAILED DESCRIPTION

The present disclosure provides a system and method for using a monitoring system to facilitate sensor-assisted gardening inside a property. The monitoring system can be used to recommend placement of plants inside a property based on sensor data obtained from one or more sensors (e.g., motion sensors, temperature sensors, humidity sensors, or the like) installed at the property. Alternatively, or in addition, the monitoring system can also monitor existing plant growth in one or more indoor gardens and perform one or more operations to assist in maintaining the indoor garden based on the monitoring of the indoor garden. Maintaining the indoor garden may include, for example, watering of plants in an indoor garden, adjusting of environmental conditions in the vicinity of an indoor garden, harvesting of plants in an indoor garden, or the like. Operations that can be performed by the monitoring system to maintain the indoor garden may include generating one or more notifications to a user to alert the user that one or more forms of maintenance of the indoor garden is required. Alternatively, operations that can be performed by the monitoring system to maintain the indoor garden may include instructing one or more configurable devices connected to the monitoring system using one or more wired or wireless networks to adjust indoor environmental conditions in the vicinity of an indoor garden. The one or more configurable devices may include an HVAC unit, a set of connected blinds, a humidification unit, a dehumidification unit, or a drone to perform one or more operations that can benefit a plant growing in an indoor garden. Other configurable devices may also be used to control or adjust environmental conditions inside a property.

Figure 1:
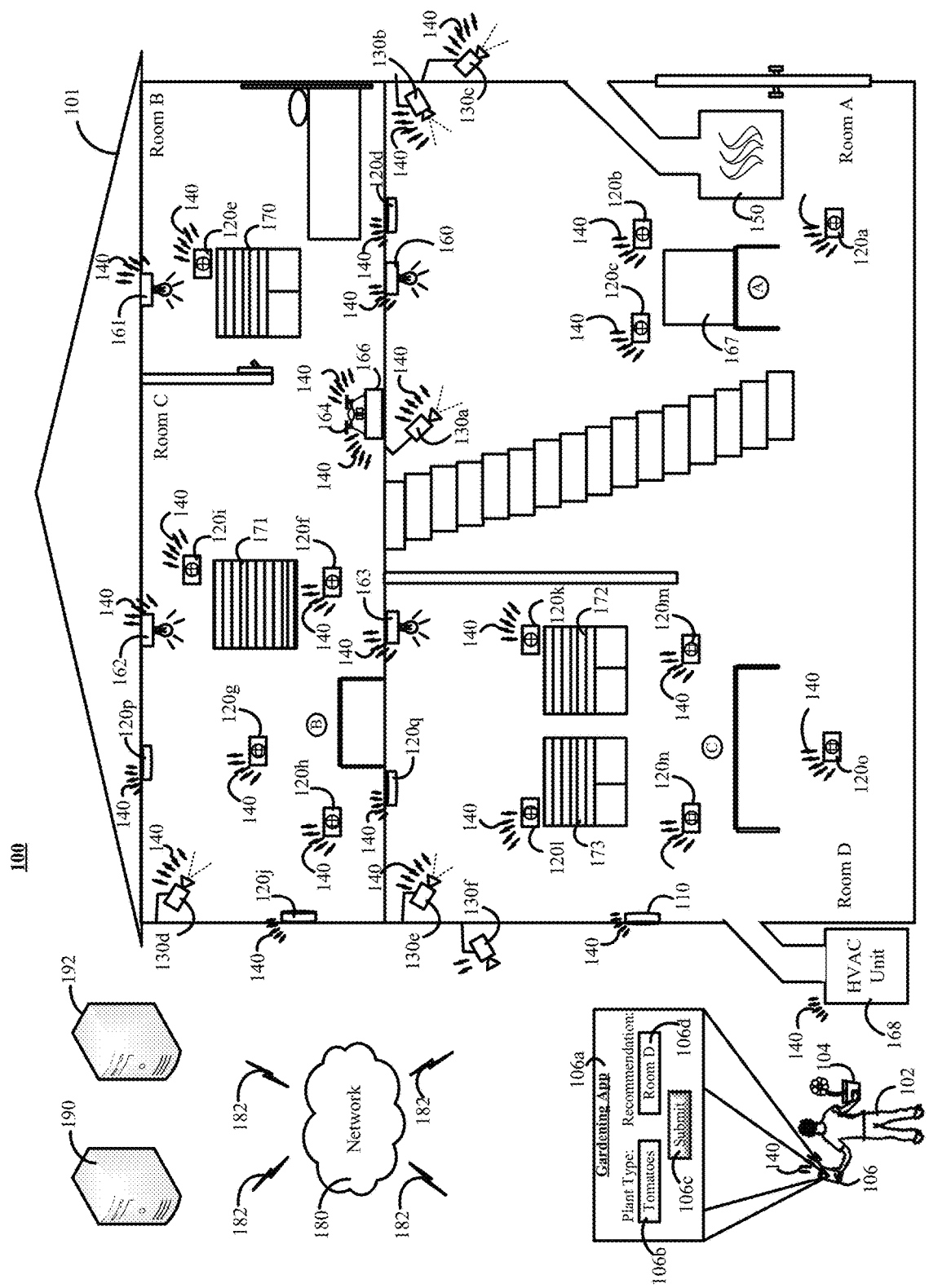
FIG. 1 is a contextual diagram of an example of a monitoring system that uses sensors to determine placement of a plant inside a property.

FIG. 1 is a contextual diagram of an example of a monitoring system 100 that uses sensors 120a, 120b, 120c, 120d, 120e, 120f, 120g, 120h, 120i, 120j, 120k, 120l, 120m, 120n, 120o, 120p, 120q to determine placement of a plant 104 inside a property 101.

The monitoring system 100 includes at least a monitoring system control unit 110, one or more sensors 120a, 120b, 120c, 120d, 120e, 120f, 120g, 120h, 120i, 120j, 120k, 120l, 120m, 120n, 120o, 120p, 120q a user device 106, a wireless network 140, and an HVAC unit 168. In addition, the system 100 may also include one or more other components such as one or more cameras 130a, 130b, 130c, 130d, 130e, 130f, one or more connected light bulbs 160, 161, 162, 163, a drone 164, a drone charging station 166, a fully enclosed planter 167, one or more connected blinds 170, 171, 172, 173, a remote network 180, one or more communication links 182, a monitoring application server 190, a central alarm station server 192, or a combination thereof.

The monitoring system control unit 110 may detect and analyze sensor data that is generated and broadcasted by one or more respective sensors 120a, 120b, 120c, 120d, 120e, 120f, 120g, 120h, 120i, 120j, 120k, 120l, 120m, 120n, 120o, 120p, 120q. Alternatively, the monitoring system control unit 110 may detect and relay the broadcasted sensor data to the monitoring application server 190, central alarm station server 192, or both, via the network 180 using one or more communication links 182 for processing and analysis by the monitoring application server 190, the central alarm station server 192, one or more operators having access to the central alarm station server 192, or a combination thereof. Accordingly, any of the operations described herein as being performed by the monitoring system control unit 110 including analyzing sensor data, performing one or operations based on the sensor data, or a combination thereof may also be performed by the monitoring application server 190, the central alarm station server 190, or any other server connected to the network 180.

The monitoring system control unit 110 can analyze the sensor data for a variety of different purposes. In some implementations, for example, the monitoring system control unit 110 can analyze the sensor data to detect the potential existence of an alarm event. An alarm event may include, for example, an event where an unauthorized person such as a burglar, trespasser, or the like has attempted to gain, or actually gained, access to the property 101. Such an alarm event may be detected by the monitoring system control unit 110 analyzing sensor generated by one or more sensors 120a, 120b, 120c, 120d, 120e, 120f, 120g, 120h, 120i, 120j, 120k, 120l, 120m, 120n, 120o, 120p, 120q such as a motion sensor, a glass-break sensor, a contact sensor, or the like. Alternatively, or in addition, the monitoring system control unit 110 can analyze sensor data to detect the potential existence of an emergency event. An emergency event may include, for example, an event that creates an emergency at the property 101 such as a fire, a water leak, a poisonous gas leak, or the like. Such an emergency event may be detected by the monitoring system control unit 110 analyzing sensor data generated by one or more sensors 120a, 120b, 120c, 120d, 120e, 120f, 120g, 120h, 120i, 120j, 120k, 120l, 120m, 120n, 120o, 120p, 120q such as a temperature sensor, a water sensor, a carbon monoxide sensor, or the like. Alternatively, or in addition, the monitoring system control unit 110 can analyze sensor data in order to assist with planning or maintaining an indoor garden. For example, the monitoring system control unit 110 can assist with planning or maintaining an indoor garden based on analysis of sensor data generated by one or more sensors 120a, 120b, 120c, 120d, 120e, 120f, 120g, 120h, 120i, 120j, 120k, 120l, 120m, 120n, 120o, 120p, 120q such as motion sensors, temperature sensors, humidity sensors, air quality sensors, or the like.

The monitoring system control unit 110 can be configured to monitor one or more zones of the property 101 such as zone A, zone B, zone C to determine whether each of the respective zones provide an environment that is suitable for growing one or more types of plants. The monitoring system control unit 110 can determine whether each respective zone of the property 101 is suitable for growing one or more types of plants based on (i) sensor data generated by one or more sensors 120a, 120b, 120c, 120d, 120e, 120f, 120g, 120h, 120i, 120j, 120k, 120l, 120m, 120n, 120o, 120p, 120q and (ii) stored plant profiles that includes a plant identifier and one or more plant attributes. The plant identifier may identify a particular type of plant (e.g., cherokee purple tomatoes). Plant attributes may include, for example, attributes describing one or more environmental factors that may result in the most favorable environment for growing the plant associated with the plant profile. Plant attributes may include temperature levels, humidity levels, air quality levels, water requirements, and the like. In some implementations, the plant attributes may specify a particular threshold value that, if satisfied, may result in a favorable growing environment for the plant associated with the plant profile. Alternatively, or in addition, plant attributes may specify a particular range of values that a particular plant attribute must fall within to create a growing environment for the plant associated with the plant profile. An example of a plant profile may include for example, a plant id "Cherokee purple tomatoes," growing temperature "68-80 degrees F.," "humidity of "80-90 percent," and air quality "moderate or better."

In some implementations, the monitoring system control unit 110 can be used to recommend a particular location in the property 101 for growing plants indoors in response to a user request for plant placement. The recommendation may be provided in response to a user request for placement of a plant such as a tomato plant 104. For example, a legitimate occupant 102 of the property 101 may use a user device 106 to access a mobile application, browser, or the like that provides the user interface 106a. The user device 106 may access the user interface 106a using the local network 140 if the user device is within range of the local network 140. The local network 140 may include a LAN, a WAN, a cellular network, a ZigBee network, a Z-Wave network, the Internet, or a combination thereof. Alternatively, the user device 106 may access the user interface 106a using the remote network 180 and one or more communication links. The remote network 180 may include, for example, a cellular network, the Internet, or a combination thereof. Though examples described herein may discuss a legitimate occupant of a property submitting requests via the user device 106 (or any other user device described herein), it is considered that any user of any user device 106 can submit the requests and receive responses from the monitoring system control unit 110 (or monitoring application server 190), as described herein.

The legitimate occupant 102 may provide as an input to the user device 106 a plant type such as "tomato." For example, the user interface 106a may prompt the legitimate occupant 102 to input a type of plant. By way of example, the legitimate occupant 102 may provide, as an input to the user device 106, the plant type "tomato" into a field 106b. In some implementations, the legitimate occupant 102 may type the word "tomato" into field 106b. Alternatively, the legitimate occupant 102 may select the word "tomato" from a drop down box of options. Alternatively, the legitimate occupant 102 may utter a voice command that verbalizes the word "tomato," the user device 106 can transcribe at least a portion of the uttered voice command as the textual word "tomato," and then provide the transcription of the word "tomato" as an input to the user device 106. In some implementations, the legitimate occupant 102 can instruct the mobile device 106 to request a particular location in property 101 for growing tomatoes. For example, the legitimate occupant 102 can select the submit icon 106c to transmit a request to the monitoring system control unit 110 (or monitoring application server 190) for a recommendation on where to plant a tomato plant such as a tomato plant 104 using the network 140, the network 180, or both. Alternatively, in some implementations, the user device 106 may automatically execute a search based on the plant name entered into field 106b in response to a determination that a user has finished entering the plant name. The request for a particular location in property 101 for growing tomatoes may include at least a plant identifier. In some implementations, the query may also include data identifying the monitoring system control unit 110 (or monitoring application server 190), the property 101, user authentication information, or a combination thereof.

The monitoring system control unit 110 (or monitoring application server 190) can receive the request for a particular location in property 101 for growing a particular plant type. For example, the monitoring system control unit 110 (or monitoring application server 190) can receive a request for a location within property 101 for planting tomatoes. The monitoring system control unit 110 (or monitoring application server 190) can access a plant profile for the plant type identified in the received request. Continuing with the example of FIG. 1, the monitoring system control unit 110 (or monitoring application server 190) may access a plant profile for a tomato plant and obtain one or more plant attributes from the plant profile for the tomato plant. For example, plant attributes obtained from a plant profile for a tomato plant may include, for example, a plant id "tomatoes," growing temperature "68-80 degrees F.," "humidity of "80-90 percent," and air quality "moderate or better." However, plant attributes of plant profiles need not be so limited. For example, in some implementations, a plant attribute profile may have less plant attributes. Alternatively, for example, a plant attribute profile may include more plant attributes. In yet other alternatives, the plant profile may include the same number of plant attributes but different plant attributes such as amount of movement desired in the vicinity of the plant (e.g., low, moderate, high), amount or type of light associated with a zone e.g., (e.g., access to direct sunlight, number of lumens, or type of light), or the like.

The monitoring system control unit 110 (or monitoring application server 190) can analyze sensor data from each of a plurality of zones in the property 101 such as zone A, zone B, and zone C in view of the plant attributes in the accessed plant profile. The monitoring system control unit 110 (or monitoring application server 190) can determine which zone of the property 101 satisfies the growing requirements specified by plant attributes in the plant profile for the plant type that the legitimate occupant 102 requested placement for. In some implementations, a zone may satisfy the growing requirements specified by the plant attributes in a plant profile for a plant type only if the zone satisfies each of the plurality of plant attributes specified by the plant profile. Alternatively, in other implementations, a zone may satisfy the growing requirements specified by the plant attributes in a plant profile for a plant type if the zone satisfies more than a predetermined threshold number of plant attributes specified by the plant profile. Alternatively, or in addition, a zone may satisfy the growing requirements specified by the plant attributes specified in a plant profile for a plant type if the zone satisfies more plant attributes specified by a plant profile than any other zone in the property 101. For example, if zone A satisfies one of four plant attributes required by a plant profile, zone B satisfies two of four plant attributes required by a plant profile, and zone C satisfies three of four plant attributes required by a plant profile, then zone C may be recommended for plant placement because zone C satisfies more plant attributes for the particular plant type than any of the other zones (e.g., A and B) in the property.

Alternatively, or in addition, a zone may satisfy growing requirements for a particular plant based on one or more weights, rankings, or scores associated with attributes of the particular plant. For example, a plant profile may weight, rank, score, or a combination thereof, plant attributes associated with the particular plant. The weight, rank, score, or a combination thereof, may indicate that a first particular plant attribute is more important to the healthy growth of the particular plant than a second particular plant attribute. For example, a tomato plant may grow better or worse within a particular temperature range, but sunlight for 3-5 hours per day may be more important to the tomato plant's healthy growth than the particular temperature range. In such instances, a sunlight attribute in the plant profile for the tomato plant may be given a higher weight, ranking, or score than the temperature range attribute of the tomato plant. In such instances, a zone may be determined to be a satisfactory zone based on how well the zone meets the values of one or more plant attributes as well as how sensitive the particular plant is to the one or plants. A plant's respective sensitivity to one or more plant attributes may be established by the weight, rank, score, or a combination thereof, of each respective attribute.

Alternatively, or in addition, the values of obtained sensor data from a first zone may also be compared against obtained sensor data from another zone as opposed to being compared directly against a threshold, range, or other value of plant attribute in a plant profile. For example, a plant attribute of a plant profile may specify the requirement of "low foot traffic." In such instances, the monitoring system control unit 110 may compare historical movement data collected via one or more motion sensors installed in the property 101 for each respective room of the property 101. In such instances, the monitoring system control unit 110 may compare the historical foot traffic for each respective room of the property 101, and select a particular zone of the plurality of zones that has the lowest foot traffic. Such methods (e.g., comparison of sensor data between rooms) may be used to break ties between rooms otherwise having the same or similar environmental features. For example, it may be determined that two or more zones have sufficient temperature and a sufficient humidity level to grow a particular plant. However, the monitoring system control unit 110 may select a particular zone of the two or more zones by determining that the particular zone has one or more environmental attributes that are better than a corresponding environmental attribute of the other zones.

In some implementations, each respective zone may be rated based on how well the zone meets the values of plant attributes maintained in a plant profile. For example, each respective zone may be rated on a scale such as "Unsuitable," "Suitable," "Ideal," or the like. Alternatively, for example, the scale may be established based on a scale of 1-10, where a "1" is unsuitable, a "10" is ideal, and all other levels falling in between. In some implementations, in response to receiving data identifying a plant, the monitoring system control unit 110 can providing a rating for each zone of the property 101 that is indicative of well the plant will grow in the zone. Alternatively, in some implementations, the monitoring system control unit 110 may only provide one or more of the highest rated zones for growing the plant identified by a received plant identifier.

With reference to the example of FIG. 1, the monitoring system control unit 110 (or monitoring application server 190) may evaluate the sensor data from each respective zone of the property 101 in view of the plant attributes specified in the plant profile for tomatoes. With reference to zone A, for example, the monitoring system control unit 110 (or monitoring application server 190) may obtain sensor data generated by a temperature sensor 120b, a humidity sensor 120c, and an air quality sensor 120d and determine whether the obtained sensor data satisfies the requirements of the plant attributes from the plant profile for tomatoes. Alternatively, or in addition, the monitoring system control unit 110 (or monitoring application server 190) can consider other sensor data from other sensors such as a motion sensor 120*a*, a light sensor, or the like. The monitoring system control unit 110 (or monitoring application server 190) can compare values based on the obtained sensor data to values, threshold values, ranges of values, or the like that are established for each respective plant attribute of the plant profile for a plant type that the legitimate occupant 102 requested placement for. The monitoring system control unit may then identify, based on the comparison, each of the plant attributes that are satisfied by the environment of zone A.

The monitoring system control unit 110 (or monitoring system control unit 190) may perform the same analysis for each respective zone of the property 101. For example, the monitoring system control unit 110 may obtain and analyze sensor data from one or more sensors in zone B such as a temperature sensor 120*h*, a humidity sensor 120*g*, and an air quality sensor 120*p*. Alternatively, or in addition, the monitoring system control unit 110 may obtain and analyze sensor data from one or more other sensors in zone B such as a motion sensor 120*f*, a light sensor 120*i*, or both. Similarly, for example, the monitoring system control unit 110 may obtain and analyze sensor data from one or more sensors in zone C such as a temperature sensor 120*n*, a humidity sensor 120*m*, and an air quality sensor 120*q*. Alternatively, the monitoring system control unit may also analyze sensor data from one or more other sensors such as a motion sensor 120*o*, one or more light sensors 120*l*, 120*k*, or both.

In some implementations, the monitoring system control unit 110 may obtain sensor data from other sensors or sensor packages than the set of sensors 120*a*, 120*b*, 120*c*, 120*d*, 120*e*, 120*f*, 120*g*, 120*h*, 120*i*, 120*j*, 120*k*, 120*l*, 120*m*, 120*n*, 120*o*, 120*p*, 120*q*. For example, the monitoring system control unit 110 may be able to obtain sensor data describing a particular zone that is broadcast by one or more robotic devices such as a robotic vacuum cleaner. In such instances, the robotic device may be able to navigate throughout the property 101 and use one or more sensors mounted to the robotic device to generate and broadcast sensor data associated with the zone where the drone is located. In some implementations, the robotic device can be configured to transmit location data with the broadcasted sensor data.

The monitoring system control unit 110 can detect the sensor data broadcasted by the robotic device and analyze the sensor data the same manner that the monitoring system control unit 110 analyzed the sensor data from the set of sensors 120*a*, 120*b*, 120*c*, 120*d*, 120*e*, 120*f*, 120*g*, 120*h*, 120*i*, 120*j*, 120*k*, 120*l*, 120*m*, 120*n*, 120*o*, 120*p*, 120*q*. The monitoring system control unit 110 can use location data transmitted by the robotic device in association with the broadcast sensor data in order to associate the broadcast sensor data with a particular zone. The robotic devices to which one or more sensors may be equipped are not limited to a robotic vacuum cleaner that is cable of navigating the property 101 on the ground. Instead, other types of robotic devices may be equipped with one or more sensors and navigate through the property 101 generating and broadcasting sensor data, location data, or both. The other types of robotic devices that can be equipped with one or more sensors and navigate through the property 101 generating and broadcasting sensor data may include, for example, the flying drone 164. The flying drone 164 can fly through the property using drone-mounted sensors to generate and broadcast sensor data, location information, or both, that the monitoring system control unit 110 can use to evaluate a zone.

Based on analysis of sensor data from each zone of FIG. 1, the monitoring system control unit may determine one or more zones of the plurality of zones that satisfy the growing environment established by the plan attributes of the plant profile for plant type input by the legitimate occupant 102. In the example of FIG. 1, the monitoring system control unit 110 (or monitoring application server 190) may select zone C (or Room D). In this example, the monitoring system control unit 110 may select zone C (or Room D) for a number of different reasons.

First, the monitoring system control unit 110 (or monitoring application server 190) may select zone C because zone C satisfies all of the plant attributes of the tomato plant profile with respect to temperature, humidity, and air quality. In contrast, zone B may be too cold because of the zone B's distant proximity to the air vent from the HVAC unit 168 and thermometer 110 and zone A may be too hot because of the wood burning fireplace 150. Since a zone C satisfies all of the plant attributes of the tomato plant profile, the monitoring system control unit 110 (or monitoring application server 190) may recommend placing the tomato plant 104 in zone C.

Alternatively, the analysis performed by the monitoring system control unit 110 (or monitoring application server 190) may be more complex, and result in an analysis of each respective environmental attribute. For example, assume that a comparison of sensor data for each respective zone indicated that each zone is associated with a temperature and humidity that satisfies the plant attributes in the tomato plant profile. In such a scenario, the monitoring system control unit 110 (or monitoring application server 190) may eliminate zone A because sensor data from the air quality sensor 120*d* indicates that the air quality in zone A is less than moderate due to smoke from the wood burning fireplace 150. In contrast, the monitoring system control unit 110 (or monitoring application server 190) may determine, based on obtained sensor data, that zones C and B each also have moderate or better air quality. In this scenario, zones C and B each satisfy all the requirements of plant profile. In such instances, the monitoring system control unit 110 (or monitoring application server 190) may output both zones on the graphical user interface 106*a* as being sufficient for placement of the tomatoes or break the tie between zone C and B.

The monitoring system control unit 110 (or monitoring application server 190) may break the tie by comparing sensor data describing environmental attributes of zone B with sensor data comparing environmental aspects of zone C. For example, though most environmental environment aspects of zone B and zone C are the same, the monitoring system control unit 110 (or monitoring application server 190) can determine that zone C (which has two windows) gets more light than zone B (which only has one window) based on a comparison of sensor data from one or more light sensors 102*l*, 120*k*, one or more cameras 130*e*, or both, and one or more light sensors 120*i*, one or more cameras 130*d*, or both. Accordingly, monitoring system control unit 110 (or monitoring application server 190) may break the tie between zones C and B based on a determination that zone C provides a better growing environment for a tomato plant than zone B because zone C has more sunlight. In this example, since the monitoring system control unit 110 (or monitoring application server 190) determines that zone C is better than zone B, the monitoring system control unit 110 (or monitoring application server 190) can provide a recommendation for display on the user interface 106a that zone C (or Room D) is where the tomato plant 104 should be placed. The legitimate occupant 102 can review the recommendation provided by the monitoring system control unit 110 (or monitoring application server 190) and place the tomato plant in zone C (or Room D).

In some implementations, the monitoring system control unit 110 (or monitoring application server 190) can provide a more detailed plant placement recommendation. For example, in some implementations, the monitoring system control unit 110 (or monitoring application server 190) may generate a heat map that can be provided to the user device 106 for display to a legitimate occupant 102. The heat map may provide a view of one or more respective rooms of the property from the perspective of the ceiling looking down towards the floor. The heat map can shade portions of a particular zone that are suited for growing a plant type input by a legitimate occupant 102 a first color (e.g., green) and then shade portions of the particular zone that are not suited for growing the plant type input by a legitimate occupant 102 a second color (e.g., red). Portions of the heat map for the particular zone may transition, for example, from the second color to the first color as the portion of the zone becomes more suitable for growing the plant type input by a legitimate occupant 102 of the property 101.

By way of example, the monitoring system control unit 110 (or monitoring application server 190) may determine based on input from one or more temperatures sensors that a particular zone varies in temperature throughout the zone. The monitoring system control unit 110 (or monitoring application server 190) may identify (i) the portions of the zone, based on temperature sensor data, that satisfy a growing temperature for the plant as set forth in the plant's plant profile and (ii) the portions of the zone, based on temperature sensor data, that do not satisfy a growing temperature for the plant as set forth in the plant's plant profile. Then, the monitoring system control unit 110 (or monitoring application server 190) generates a heat map that colors the portions of the zone satisfying the growing temperature a first color and the portions of the heat map not satisfying the growing temperature a second color. Portions of the zone may gradually transition between the first color to the second color as the temperature gradually changes.

Though this example is specific to temperatures, a heat map can be generated in a similar manner for other types of plant attributes such as humidity, air quality, historical motion, light, or the like. Alternatively, or in addition, the heat map may be based on a plurality of plant attributes whose contribution to the growing environment have been aggregated using a weighted combination of the respective attributes that is based on sensor data obtained from a plurality of different sensors.

The heat map may be generated on a pixel-by-pixel basis. For example, each pixel of the heat map may correspond to a particular portion of a zone. If the portion of the zone associated with the pixel is determined to satisfy a value of a plant attribute in the plant profile, then the pixel may be used to display a first color (e.g., green). Alternatively, if the portion of the zone associated with the pixel is determined to not satisfy a value of a plant attribute in the plant profile, then the pixel may be used to display a second color (e.g., red). In some implementations, however, each respective pixel may be colored based on a weight combination of sensor data corresponding to each of a plurality of plant attributes.

The aforementioned heat map can be aid a legitimate occupant 102 in determining where a particular plant should be placed inside a particular zone. For example, based on the sensor data collected by the monitoring system control unit 110 (or monitoring application server 190) about zone C, the monitoring system control unit 110 (or monitoring application server 190) can determine that an area of zone C in front of windows with an abundance of sunlight and stable temperature may be highlighted on a heat map as being a more suitable for growing a tomato plant than an area of zone C that is not in direct sunlight and has a lower temperature. The monitoring system control unit 110 (or monitoring application server 190) may generate a heat map of zone C to efficiently provide this information for display on a user device 106. The heat map of zone C can be provided with the monitoring system control unit's 110 (or monitoring application server's 19) recommendation to place the tomato in zone C to grow. Alternatively, the heat-map may be provided in response to a separate request form the legitimate occupant of the property 101.

In some implementations, the monitoring system control unit 110 (or monitoring application server 190) may determine that there is not a single zone in the property 101 that has an environment that is suitable for growing a plant type input by a user such as a legitimate occupant 102 of the property 101 in to a user device 106. For example, with reference to the example of FIG. 1, assume that the monitoring system control unit 110 (or monitor application server 190) determines that neither zone A, zone B, or zone C have an environment that is suitable for growing tomatoes. In such instances, the monitoring system control unit 110 (or monitoring application server 190) may recommend that the user such as legitimate occupant 102 of the property 101 install a fully enclosed planter 167 with its own built in lights, temperature control system, humidification unit, a dehumidification unit, or a combination thereof. The fully enclosed planter 167 can then provide an indoor environment that is suitable for growing tomatoes.

The monitoring system control unit 110 (or monitoring application server 190) can also identify other types of planters that may be suitable for a particular plant type. For example, a user such as a legitimate occupant of the property 101 may input a request for a planter type that includes a type of plant that the user wants to plant indoors at the property 101. The monitoring system control unit 110 (or monitoring application server 190) may determine, based on (i) the plant attributes values stored in the plant profile for the plant types input by the user, (ii) the environmental characteristics of a particular zone, or (iii) a combination thereof, one or more optimal planters that can be used for growing the plant types identified by the user. In this implementation, the identified planters need not be fully enclosed.

The monitoring system control unit 110 (or monitoring application server 190) may make other types of recommendations. For example, a user such as a legitimate occupant 102 of the property 101 can user a submit a request to the monitoring system control unit 110 (or monitoring application server 190) that asks the monitoring system control unit 110 (or monitoring application server 190) to identify a set of one or more plant types that are suitable for growing indoors at the property 101. In response to request to identify a set of one or more plant types that are suitable for growing indoors at the property 101, the monitoring system control unit 110 (or monitoring application server 190) may analyze the environment of each zone of the property based on sensor data that is generated by one or more sensors 120a, 120b, 120c, 120d, 120e, 120f, 120g, 120h, 120i, 120j, 120k, 120l, 120m, 120n, 120o, 120p, 120q installed at the property.

The monitoring system control unit 110 (or monitoring application server 190) can determine based on (i) plant attributes stored in plant profiles and (ii) sensor generated by the one or more sensors. For example, the monitoring system control unit 110 (or monitoring application server 190) may identify one or more plant profiles that have a plant attribute value such as temperature, humidity, air quality, light, historical levels motion in the zone, or a combination, thereof, that match, or are within a threshold margin of, the respective environmental characteristics obtained via the one or more sensors, historical sensor data, or a combination thereof. In some implementations, the monitoring system control unit 110 (or monitoring application server 190) may identify the one or more plant profiles that have plant attributes values that match, or fall within a threshold margin of, the environmental characteristics of a particular zone by performing a search of a plant profile database based sensor data generated by the one or more sensors 120a, 120b, 120c, 120d, 120e, 120f, 120g, 120h, 120i, 120j, 120k, 120l, 120m, 120n, 120o, 120p, 120q. The monitoring system control unit 110 (or monitoring application server 190) may provide a set of one or more plant identifiers to the user device 106 (e.g., a legitimate occupant of the property 101) that are associated with plant types that can be grown indoors at the property 101. In some implementations, the monitoring system control unit 110 (or monitoring application server 190) can provide data that can be used to generate a user interface on the user device 106 for display on the user device 106 that shows an identifier for one or more types of plants that can be grown in each respective zone of the property 101. However, the present disclosure need not be limited to the display of plant identifiers on the display of the user device 106. For example, the one or more plant identifiers that are associated with plants that can grow indoors at the property 101 may be output using an audio output from a speaker of the user device, off the monitoring system control unit 110, or any other speaker that is associated with a device to which the plant identifiers can transmitted to for audio output.

The description of the example of system 100 with reference to FIG. 1 references one or more zones of property 101. In some instances, the description of the example of system 100 may appear to equate a zone with a room of the property 101. However, the present disclosure need not be so limited. For example, in some implementations, a single room may include multiple zones. Instead of being defined by physical barriers, a zone may be interpreted as being established by a particular group of one or more sensors. The monitoring system control unit 110 (or monitoring application server 190) may then determine the environmental characteristics of each particular zone of a property based on the sensor data generated by the respective group of sensors defining the zone. Analyzing environmental characteristics of a property that are detected by a group of sensors allows the monitoring system control unit 110 (or monitoring application server 190) to analyze environmental characteristics of particular zones and provides the opportunity for single room to have multiple zones.

Figure 2:
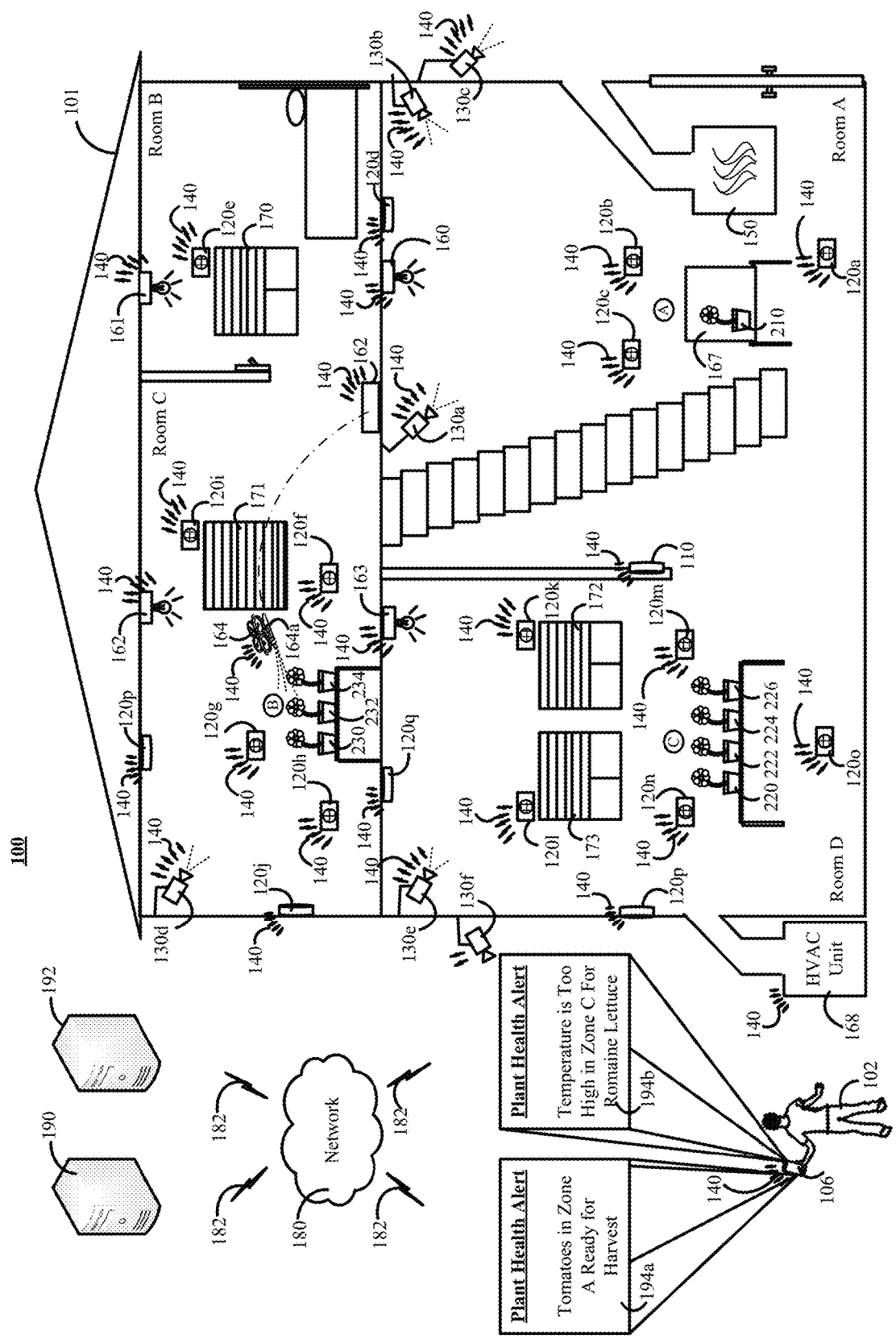
FIG. 2 is another contextual diagram of an example of a monitoring system that uses sensors to assist with indoor gardening.

FIG. 2 is another contextual diagram of an example of a monitoring system 100 that uses sensors 120a, 120b, 120c, 120d, 120e, 120f, 120g, 120h, 120i, 120j, 120k, 120l, 120m, 120n, 120o, 120p, 120q to assist with indoor gardening.

The system 100 of FIG. 2 is the same as the system 100 of FIG. 1. However, the system 100 of FIG. 2 is being used for a different purpose that described with reference to FIG. 1. In FIG. 2, the system 100 is being used to monitor the growth of one or more plants that are growing in zone A, zone B, and zone C.

For example, with reference to zone A, the monitoring system control unit 110 (or monitoring application server 190) can monitor the growth of a plant such as a tomato plant 210 that is growing in the fully enclosed planter 167. In some implementations, the monitoring system control unit 110 (or monitoring application server 190) can monitor the growth of the tomato plant 210 by analyzing images, videos, or both, of the tomato plant 210 captured by one or more cameras 130a, 130b installed in the property 101. The monitoring system control unit 110 (or monitoring application server 190) can determine, based on the captured pictures of the tomato plant 210, whether the tomato plant 210 needs water, whether one or more tomatoes on the tomato plant 210 are ripe for harvesting, or the like.

In some implementations, the monitoring system control unit 110 (or monitoring application server 190) may use a series of machine learning models to determine whether one or more actions need to be performed to maintain the tomato plant 210. For example, the monitoring system control unit 110 (or monitoring application server 190) can obtain a first image (or video) of the tomato plant 210 from a camera such as camera 130b. The monitoring system control unit 110 (or monitoring application server 190) may provide the first input to a first machine learning model that has been trained to determine whether an image depicts a plant. If the monitoring system control unit 110 (or monitoring application server 190) determines, based on the output of the first machine learning model that has been trained to determine whether an image depicts a plant, that the first image does not depict a plant, the process may end. Alternatively, if the monitoring system control unit 110 (or monitoring application server 190) determines, based on the output of the first machine learning model that has been trained to determine whether an image likely depicts a plant, that the image likely depicts a plant, then the monitoring system control unit 110 (or monitoring application server 190) may provide the first image to a second machine learning model.

In this example, the first image taken by camera 130b includes a tomato. So, the first machine learning model processes the first image and generates output data that indicates that it is likely that the first image depicts a plant. The monitoring system control unit 110 (or monitoring application server 190) can determine, based on the output data of the first machine learning model, that the first image likely depicts a plant. Based on the determination that the first image likely depicts a plant, the monitoring system control unit 110 (or monitoring application server 190) may then provide the image (or video) that likely depicts a plant to a second machine learning model that has been trained to determine whether the first image depicts leaves that are likely healthy.

If the monitoring system control unit 110 (or monitoring application server 190) determines, based on the output of the second machine learning model that has been trained to determine whether an image depicts leaves that are likely health, that the image depicts leaves that are not healthy (e.g., because the leaves are yellow, shriveled, or the like), then the monitoring system control unit 110 (or monitoring application server 190) may transmit an alert to a user device 106 of a user such as a legitimate occupant 102 of the property 101. The alert may indicate, for example, that the plant in tomato plant 210 in zone A (or Room A) is dying, that the tomato plant in 210 in zone A (or Room A) needs water, or the like. In some implementations, the monitoring system control unit 110 (or monitoring application server 190) may also, or alternatively, instruct a drone equipped with a water tank to navigate to, and water, the tomato plant 210. In other implementations, the monitoring system control unit 110 (or monitoring application server 190) may instruct the drone to navigate to an installed watering system and open a tap attached to a line that waters one or more particular plants. Alternatively, if the monitoring system control unit 110 (or monitoring application server 190) determines, based on the output of the second machine learning model that has been trained to determine whether an image depicts leaves that are likely healthy, that the image depicts leaves that are likely healthy, then the monitoring system control unit 110 (or monitoring application server 190) may provide the first image to a third machine learning model.

Continuing the example of the tomato plant 210 of FIG. 2, the monitoring system control unit 110 (or monitoring application server 190) has already determined, based on the output of the first machine learning model and the second machine learning model that the first image likely depicts a plant and that the first image likely depicts leaves that are likely healthy. Next, the monitoring system control unit 110 (or monitoring application server 190) can then provide the first image that likely depicts a plant and likely depicts leaves that are likely healthy to a third machine learning model that has been trained to determine whether the first image depicts an item (e.g., fruit, vegetable, or leaf) that is likely ripe for picking. In some implementations, the third machine learning model may alternatively be trained to determine whether the first image depicts an item (e.g., fruit, vegetable, or leaf) that is likely to be ripe for picking within a given time period.

If the monitoring system control unit 110 (or monitoring application server 190) determines, based on the output of the third machine learning model that has been trained to determine whether an image likely depicts an item (e.g. fruit, vegetable, or leaf) that is likely ripe for picking (or will likely be ripe for picking within a given time period), that the image depicts an item (e.g., fruit, vegetable, or leaf) that is likely ripe for the picking (or will likely be ripe for picking within a given time period), then the monitoring system control unit 110 (or monitoring application server 190) may transmit alert 194a to a user device 106 of a user such as a legitimate occupant 102 of the property 101. The alert 194a may indicate, for example, that tomatoes in zone A are ready for harvest. Alternatively, if the monitoring system control unit 110 (or monitoring application server 190) determines, based on the output of the third machine learning model that has been trained to determine whether an image depicts an item (e.g., fruit, vegetable, or leaf) that is likely ripe for the picking (or will likely be ripe for picking within a given time period), that the first image does not depict an item (e.g., fruit vegetable, or leaf) that is ripe for the picking (or will not be ripe for picking within a given time period), then the monitoring system control unit 110 (or monitoring application server 190) may determine, based on the output of the third machine learning model, that the process should end.

Alternatively, or in addition, in some implementations, the monitoring system control unit 110 (or monitoring application server 190) can use image analysis or video analysis to determine whether one or more captured images, videos, or both, depict one or more characteristics of the tomato plant 210 that require action. For example, the monitoring system control unit 110 (or monitoring application server 190) can analyze the images and video to determine whether the tomatoes need water, whether one or more tomatoes are ripe for harvest, whether one or more tomatoes are rotted, or the like. The monitoring system control unit 110 (or monitoring application server 190) may make such determinations based on, for example, the color of one or more aspects of the tomato plant 210. For example, if an analysis of captured images or video of the tomato plant 210 reveals that the leaves of the tomato plant 210 are yellow, then the monitoring system control unit 110 (or monitoring application server 190) can generate and transmit an alert to a user device 106 of a user such as a legitimate occupant 102 of the property 101 suggesting that the user water the plants. Alternatively, in response to determining that the leaves of the tomato plant 210 are yellow, the monitoring system control unit 110 (or monitoring application server 190) may instruct a drone equipped with a water tank to navigate to the tomato plant 210 and water the tomato plant 210.

Similarly, the monitoring system control unit 110 (or monitoring application server 190) can determine, based on the analysis of colors in an image, whether one or more tomatoes are ripe for picking. For example, the monitoring system control unit 110 (or monitoring application server 190) may determine that the redness of the one or more tomatoes in a captured image is indicative of a ripe tomato that is ready for harvest. In such instances, the monitoring system control unit 110 (or monitoring application server 190) may generate and transmit an alert to a user device 106 of a user such as a legitimate occupant 102 of the property 101 alerting the user that tomatoes in zone A (or Room A) are ready for harvest.

Continuing with the example of FIG. 2, with reference to zone B, the monitoring system control unit 110 (or monitoring application server 190) may monitor the growth of a set of one or more plants growing indoors such as romaine lettuce plants 220, 222, 224, 226. For example, the monitoring system control unit 110 (or monitoring application server 190) can be configured to know (i) the type of plant that is growing in a particular zone, and (ii) perform one or more operations in response to a determination that one or more environmental characteristics of the particular zone have become unsuitable for the health of the plant type currently growing in the particular zone. The monitoring system control unit 110 (or monitoring application server 190) may come to "know" the type of plant growing in each respective zone in a variety of different ways. For example, the monitoring system control unit 110 (or monitoring application server 190) may obtain one or more images (or videos) captured from one or more cameras such as camera 130e and determine that the obtained images (or video) depicts a particular type of plant such as romaine lettuce. Alternatively, or in addition, the monitoring system control unit 110 (or monitoring application server 190) may receive input from a user device (or directly from a user via a monitoring system control unit 110 control panel) identifying a type plant that is growing in a particular zone. The one or more operations may include, for example, generating an alert that is transmitted to a user device 106 of a user such as a legitimate occupant 102 of the property 101 that alerts the user that one or more environmental characteristics of the particular zone have become unsafe for the plant growing in the zone.

For example, the monitoring system control unit 110 (or monitoring application server 190) may determine that the environment in zone C has become unsuitable for growing romaine lettuce plants 220, 222, 224, 226 because the temperature in zone C is too high. The monitoring system control unit 110 (or monitoring application server 190) may determine that the temperature in zone C is too high based on a comparison of sensor data generated by the temperature sensor 120*n* to the growing temperature of romaine lettuce that is stored as a plant attribute value in a plant profile maintained by the monitoring system control unit 110 (or monitoring application server 190) for romaine lettuce. In response to determining that the temperature in zone C has exceeded the growing temperature of romaine lettuce that is stored as a plant attribute value in a plant profile, the monitoring system control unit 110 (or monitoring application server 190) may generate and transmit an alert to a user device 106 of a user such as a legitimate occupant 102 of the property 101 notifying the user that the temperature in zone C is too high for growing romaine lettuce. The alert can be provided for display in the user interface 194*b*. This allows the user such as a legitimate occupant 102 of the property 101 to take necessary steps to reduce the temperature in zone C in order to recreate a suitable environment for growing romaine lettuce inside property 101.

Alternatively, or in addition, the monitoring system control unit 110 (or monitoring application server 190) may instruct one or more components of the monitoring system 100 to perform a certain operation in order to initiate an adjustment of the one or more environmental characteristics that have become unsuitable for a particular plant's growth back to a level that is suitable for the plant's growth. For example, monitoring system control unit 110 (or monitoring application server 190) may determine, based on sensor data generated by a temperature sensor 120*n*, that the temperature is too high in zone C, thereby creating an unsuitable environment for growing romaine lettuce. The monitoring system control unit 110 (or monitoring application server 190) may determine that the temperature in zone C is too high based on a comparison of sensor data generated by the temperature sensor 120*n* to the growing temperature of romaine lettuce that is stored in as a plant attribute in a plant profile for romaine lettuce. For example, the monitoring system control unit 110 (or monitoring application server 190) may determine that the current temperature in zone C, based on sensor data from temperature sensor 120*n*, exceeds the maximum temperature for suitably growing romaine lettuce as indicated by the plant profile.

In such instances, the monitoring system control unit 110 (or monitoring application server 190) can perform one or more operations to lower the temperature in zone C back to a level that is suitable for growing romaine lettuce. For example, the monitoring system control unit 110 (or monitoring application server 190) may instruct the HVAC unit 168 to begin outputting cool air into zone C to reduce the temperature in zone C. Such an instruction may be sent directly to the HVAC unit 168. Alternatively, the instruction to begin outputting cool air into zone C may be sent to a thermostat 120*p*. For example, the monitoring system control unit 110 (or monitoring application server 190) may transmit an instruction to the thermostat 120*p* to reduce the temperature setting of the thermostat 120*p*. Alternatively, or in addition, the monitoring system control unit 110 (or monitoring application server 190) may instruct one or more connected-blinds 172, 173 to close in an effort to reduce the amount of direct sunlight hitting zone C, create some shade, and thereby reducing the temperature of zone C.

Continuing with the example of FIG. 2, with reference to zone B, the monitoring system control unit 110 (or monitoring application server 190) may monitor the growth of a set of one or more plants growing indoors such as strawberry plants 230, 232, 234. The monitoring system control unit 110 (or monitoring application server 190) may determine, based on one or more captured images of the strawberry plants 230, 232, 234, that the strawberry plants 230, 232, 234 need to be watered. For example, the monitoring system control unit 110 (or monitoring application server 190) may provide one or more images of the strawberry plants 230, 232, 234 to a series of machine learning models, as discussed above with respect to the image of a tomato plant 210. Based on the output generated by one or more of the machine learning models, the monitoring system control unit 110 (or monitoring application server 190) may determine that the strawberry plants 230, 232, 234 need water. Alternatively, or in addition, the monitoring system control unit 110 (or monitoring application server 190) may perform image or video analysis to determine that images of the strawberry plants 230, 232, 234 depict, e.g., yellow leaves, and as a result, likely require water.

In response to determining that the strawberry plants 230, 232, 234 may instruct a drone 164 that is equipped with a water tank and spray nozzle 164*a* to navigate to zone B and water the strawberry plants 230, 232, 234. In some implementations, the drone 164 may be charging on the charging station 162 when the drone receives the instruction to navigate to zone B and water the strawberry plants 230, 232, 234. Alternatively, in some implementations, the drone 164 may be navigating through the property 101 performing routine surveillance operations with the monitoring system in an "armed-away" state. In such instances, the drone may receive the instruction to navigate to zone B and water the strawberry plants 230, 232, 234, interrupt the drone's 164 surveillance operations of the property 101, and navigate to zone B to water the strawberry plants 230, 232, 234. Once the drone 164 has watered the strawberry plants 230, 232, 234, then the drone 164 may resume the surveillance operations of the property 101. Surveillance operations may include, for example, navigating throughout the property using the suite of sensors with which the drone is equipped to scan for potential occurrences that may be indicative of a potential alarm event.

Figure 3:
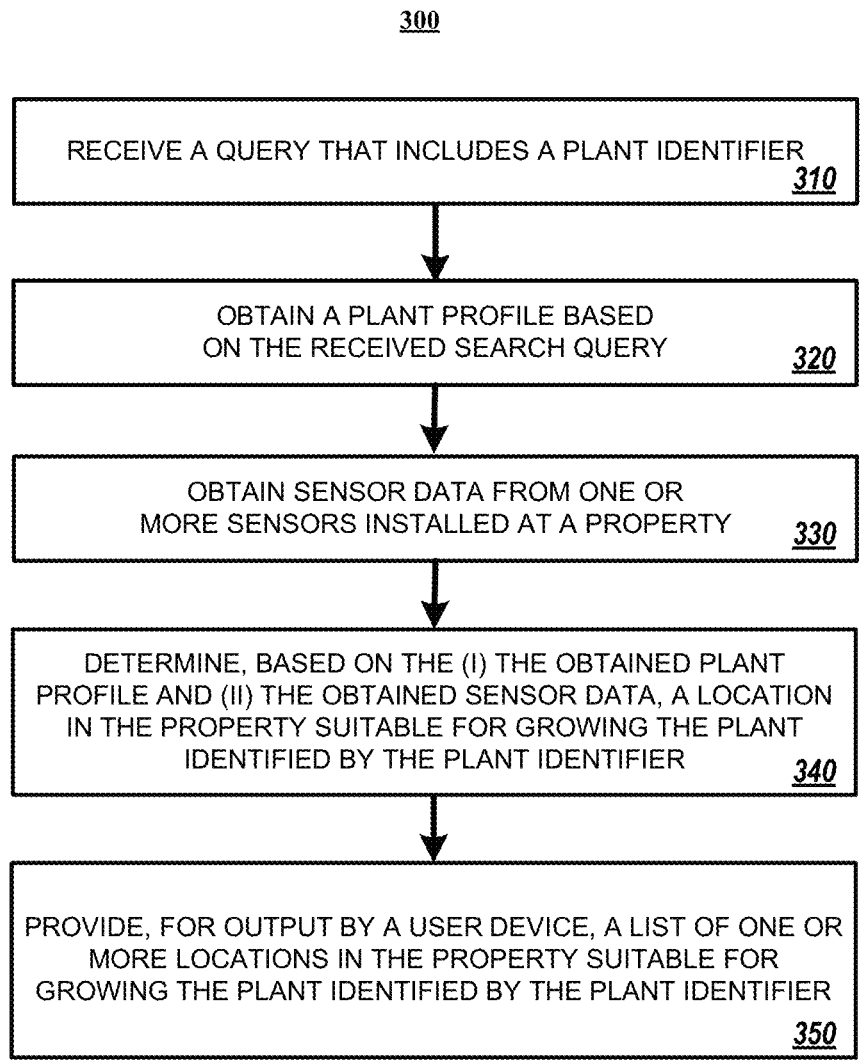
FIG. 3 is a flowchart of an example of a process for using a monitoring system to determine placement of a plant inside a property.

FIG. 3 is a flowchart of an example of a process 300 for using a monitoring system to determine placement of a plant inside a property. Generally, the process 300 may include receiving a query that includes a plant identifier (310), obtaining a plant profile based on the received query (320), obtaining sensor data from one or more sensors installed at a property (330), determining, based on the (i) the plant profile and (ii) the sensor data, a location in the property suitable for growing the plant identified by the plant identifier (340), and providing, for output by a user device, one or more locations in the property suitable for growing the plant identified by the plant identifier (350). For convenience, the process 300 will be described below as being performed by a monitoring unit such as the monitoring system control unit 110 or monitoring application server 190 of FIGS. 1 and 2.

A monitoring unit can begin performing process 300 by receiving 310 a query that includes a plant identifier. The plant identifier may include, for example, a plant type such as tomato, lettuce, strawberries, or the like. In addition, the query may identify a monitoring unit identifier, a property identifier, or a combination thereof.

The monitoring unit can obtain 320 a plant profile based on the received query. For example, the monitoring unit can perform a search of a plant profile database based on the received query that includes a plant identifier. The plant profile database may be a local plant profile database stored on the monitoring unit. Alternatively, the plant profile database may be stored remote from the monitoring unit and the monitoring unit can transmit the query that includes a plant identifier to a remote computer storing the plant profile database, and receive one or more plant profiles that are response to the transmitted query. A plant profile may include a plurality of plant attributes.

Plant attributes may include, for example, attributes describing one or more environmental factors that may result in the most favorable environment for growing the plant associated with the plant profile. Such plant attributes may include, for example, temperature levels, humidity levels, air quality levels, water requirements, and the like. In some implementations, the plant attributes may specify a particular threshold value that, if satisfied, may result in a favorable growing environment for the plant associated with the plant profile. Alternatively, or in addition, plant attributes may specify a particular range of values that a particular plant attribute must fall within to create a growing environment for the plant associated with the plant profile. An example of a plant profile may include for example, a plant id "tomatoes," growing temperature "68-80 degrees F.," "humidity of "80-90 percent," and air quality "moderate or better."

The monitoring unit can obtain 330 sensor data from one or more sensors installed at a property. For example, the monitoring unit can obtain sensor data for each zone of a plurality of zones of the property. The obtained sensor data may describe a variety of different environmental characteristics of each respective zone. The environmental characteristics may include, for example, a temperature of the zone, a humidity of the zone, an air quality of the zone, an amount (or type) of light available for the zone, historical motion data for the zone, or a combination thereof.

The monitoring unit can determine 340, based on the (i) obtained plant profile and (ii) the obtained sensor data, a location in the property suitable for growing the plant identified by the plant identifier. For example, the monitoring unit can determine a location in the property suitable for growing the plant identified by the plant identifier in the received query by analyzing sensor data obtained from the property in view of the plant attributes associated with the obtained plant profile. In some implementations, the monitoring unit can analyze sensor data obtained from each zone of a plurality of zones in the property in view of the plant attributes in the plant profile to determine the zone that is best suited for growing the plant identified by the plant identifier in the received query.

In some implementations, a particular zone of the property may satisfy the growing requirements specified by the plant attributes in a plant profile for a plant type only if the zone satisfies each of the plurality of plant attributes specified by the plant profile. Alternatively, in other implementations, a zone may satisfy the growing requirements specified by the plant attributes in a plant profile for a plant type if the zone satisfies more than a predetermined threshold number of plant attributes specified by the plant profile. Alternatively, or in addition, a zone may satisfy the growing requirements specified by the plant attributes specified in a plant profile for a plant type if the zone satisfies more plant attributes specified by a plant profile than any other zone in the property. For example, if a zone A satisfies one of four plant attributes required by a plant profile, a zone B satisfies two of four plant attributes required by a plant profile, and a zone C satisfies three of four plant attributes required by a plant profile, then the zone C may be recommended for plant placement because the zone C satisfies more plant attributes for the particular plant type than any of the other zones (e.g., A and B) in the property.

Alternatively, or in addition, the values of obtained sensor data from a first zone may also be compared against obtained sensor data from another zone as opposed to being compared directly against a threshold, range, or other value of plant attribute in a plant profile. For example, a plant attribute of a plant profile may specify the requirement of "low foot traffic." In such instances, the monitoring unit may compare historical movement data collected via one or more motion sensors installed in the property for each respective room of the property. In such instances, the monitoring unit may compare the historical foot traffic for each respective room of the property, and select a particular zone of the plurality of zones that has the lowest foot traffic. Such methods (e.g., comparison of sensor data between rooms) may be used to break ties between rooms otherwise having the same or similar environmental features. For example, it may be determined that two or more zones have sufficient a temperature and a sufficient humidity level to grow a particular plant when analyzed in view of the plant attributes of the plant profile. However, the monitoring unit may select a particular zone of the two or more zones by determining that the particular zone has one or more environmental attributes that are better than a corresponding environmental attribute of the other zones.

The monitoring unit can provide 350, for output by a user device, one or more locations in the property suitable for growing the plant identified by the plant identifier. For example, the monitoring unit can provide rendering data to a user device that submitted the received query that, when rendered, will display data identifying the one or more locations in the property identified at stage 340 as being suitable for growing the plant identified in the query received at stage 310. Alternatively, or in addition, the rendering data that, when rendered, will display data identifying the one or more locations in the property identified at stage 340 as being suitable for growing the plant identified in the query received a stage 310 can be provided to another user interface (e.g., a monitoring unit interface) that is within eyesight of the user that submitted the query received at stage 310. Alternatively, the monitoring unit can provide data identifying the one or more locations in the property identified at stage 340 that can be output as audio data from a speaker on the user device that submitted the query received at stage 310, or another speaker within listening range of a user that submitted the query received at stage 310.

Alternatively, in some implementations, the monitoring unit can provide a heat map for output on a user device, an interface of the monitoring unit, or some other interface accessible to a user that submitted the query received at stage 310. The heat map may provide a view of one or more respective rooms of the property from the perspective of the ceiling looking down towards the floor. The heat map can shade portions of a particular zone that are suited growing plant type identified in the query received at stage 310 a first color (e.g., green) and then shade portions of the particular zone that are not suited for growing the plant type identified in the query received at stage 310 a second color (e.g., red). Portions of the heat map for the particular zone may transition, for example, from the second color to the first color as the portion of the zone becomes more suitable for growing the plant type identified in the query received at stage 310.

Figure 4:
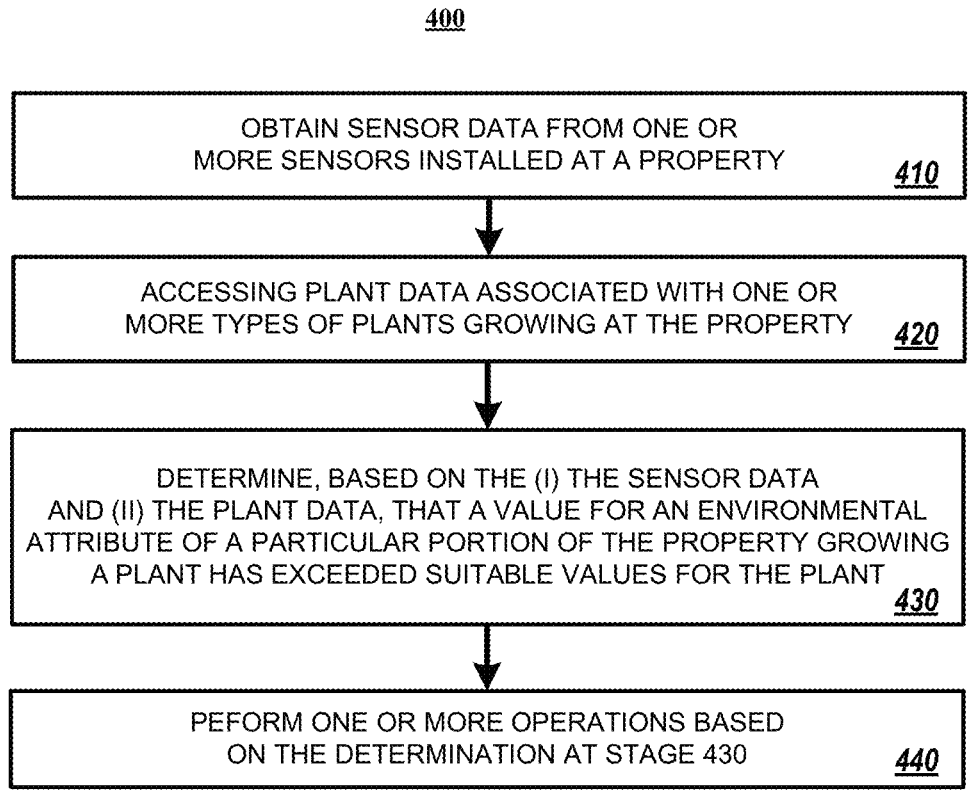
FIG. 4 is a flowchart of an example of a process for using a monitoring system to assist with indoor gardening.

FIG. 4 is a flowchart of an example of a process 400 for using a monitoring system to assist with indoor gardening. Generally, the process 400 may include obtaining sensor data from one or more sensors installed at a property (410), accessing plant data associated with one or more types of plants growing at the property (420), determining, based on (i) the sensor data and (ii) the plant data, that a value for an environmental attribute associated with a particular portion of the property growing a plant has exceeded suitable values for the plant (430), and performing one or more operations based on the determining at stage 430 (440). For convenience, the process 400 will be described below as being performed by a monitoring unit such as the monitoring system control unit 110 or monitoring application server 190 of FIGS. 1 and 2.

A monitoring unit can begin performing the process 400 by obtaining 410 sensor data from one or more sensors installed at a property. For example, the monitoring unit can obtain sensor data for each zone of a plurality of zones of the property. The obtained sensor data may describe a variety of different environmental characteristics of each respective zone. The environmental characteristics may include, for example, a temperature of the zone, a humidity of the zone, an air quality of the zone, an amount (or type) of light available for the zone, historical motion data for the zone, or a combination thereof.

The monitoring unit can access 420 plant data associated with one or more types of plants growing at the property. For example, the monitoring unit can access plant data for one or more plant types that the monitoring unit "knowns" are growing in the property. Accessing plant data may include, for example, performing a search of a local or remote plant data database. Plant data may include a plant profile, a plant attributes included in a plant profile, or a combination thereof.

In some implementations, accessing plant data may include the monitoring unit performing a search for a particular plant identifier. Alternatively, accessing plant data may include the monitoring unit performing a search for multiple different plant identifiers. In some implementations, the multiple different plant identifiers that, taken together as a set, represent each of the plant identifiers of respective plants that the monitoring unit knows are growing at the property. The monitoring unit may come to "know" the type of plant growing in each respective zone in a variety of different ways. For example, the monitoring unit may obtain one or more images (or videos) captured from one or more cameras and determine that the obtained images (or video) depict a particular type of plant such as romaine lettuce. Alternatively, or in addition, the monitoring unit may receive input from a user device (or directly from a user via a monitoring system unit control panel) identifying one or more plant types that are growing in each respective zone of the property.

The monitoring unit can determine 430, based on (i) the sensor data and (ii) the plant data, that a value for an environmental attribute associated with a particular portion of the property growing a plant has exceeded suitable values for the plant. For example, the monitoring unit may determine that a temperature of a first zone is too high based on a comparison of sensor data generated by a temperature sensor to the growing temperature of a plant that is stored as a plant attribute value in a plant profile maintained by the monitoring unit, or a remote server, for the plant.

The monitoring unit can perform 440 one or more operations based on the determining of stage 430. For example, in response to determining that the temperature of the first zone has exceeded the growing temperature of a plant that is stored as a plant attribute value in a plant profile, the monitoring unit may generate and transmit an alert to a device such as a user device notifying the user of the user device that the temperature in the first zone is too high for growing the plant associated with the plant attribute value that has been exceeded. This allows the user to take necessary steps to reduce the temperature in the first zone in order to recreate a suitable environment for growing the plant associated with the plant attribute value in the first zone of the property.

Figure 5:
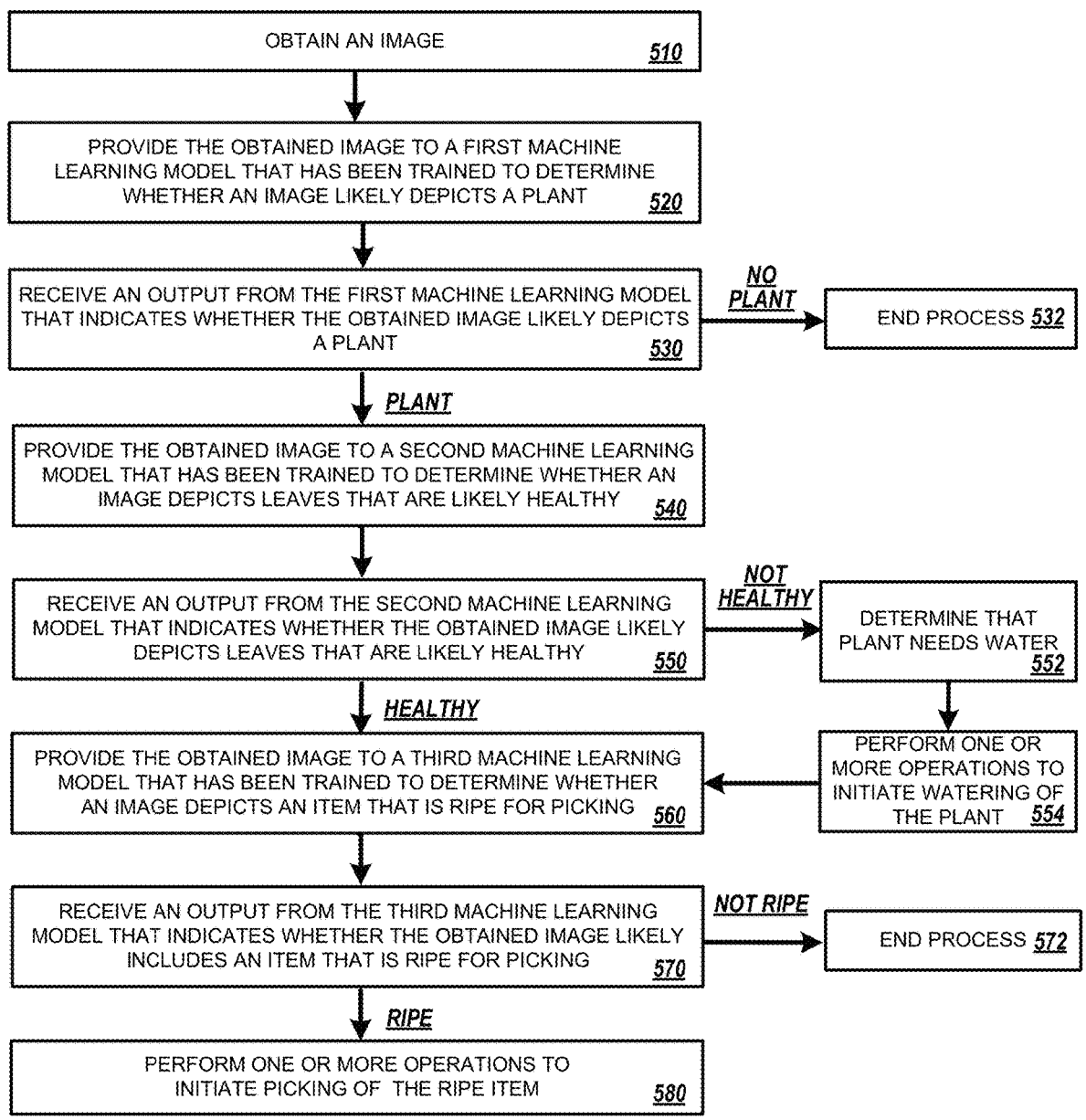
FIG. 5 is a flowchart of another example of a process for using a monitoring system to assist with indoor gardening.

FIG. 5 is a flowchart of another example of a process 500 for using a monitoring system to assist with indoor gardening. Generally, the process 500 may include obtaining an image (510), providing the obtained image to a first machine learning model that has been trained to determine whether an image likely depicts a plant (520), and receiving an output from the first machine learning model that indicates whether the obtained image likely depicts a plant (530). If the output from the first machine learning model indicates that it is not likely that the obtained image depicts a plant, then the process ends (532). Alternatively, if the output from the first machine learning model indicates that it is likely that the obtained image depicts a plant, then the process 500 can continue by providing the obtained image to a second machine learning model that has been trained to determine whether an image depicts leaves that are likely healthy (540) and receiving an output from the second machine learning model that indicates whether the obtained image likely depicts leaves that are likely healthy (550). If the output from the second machine learning model indicates that it is not likely that the obtained image depicts healthy leaves, then the process 500 continues by determining that the plant depicted by the obtained image needs water (552), performing one or more operations to initiate watering of the plant depicted by the obtained image (554), and then the process 500 continues to stage 560. Alternatively, if the output from the second machine learning model indicates that it is likely that the obtained image depicts leaves that are healthy, then the process 500 can continue by providing the obtained image to a third machine learning model that has been trained to determine whether an image depicts an item that is ripe for picking (560) and receiving an output from the third machine learning model that indicates whether the obtained imager likely includes an item that is ripe for the picking (570). If the output of the third machine learning model indicates that it is not likely that the obtained image depicts an item that is ripe for picking, then the process ends (572). Alternatively, if the output of the third machine learning model indicates that the obtained image likely depicts an item that is ripe for picking, then the process 500 may continue by performing one or more operations to initiate picking of the item that is ripe for picking 580. For convenience, the process 500 will be described below as being performed by a monitoring unit such as the monitoring system control unit 110 or monitoring application server 190 of FIGS. 1 and 2.

A monitoring unit can begin performing process 500 by obtaining 510 an image. In some implementations, the image may depict a plant such as a lettuce plant, a tomato plant, a strawberry plant, or the like. Alternatively, in some implementations, the image may not depict a plant. The image may be obtained from one or more cameras of a plurality of cameras installed through a property.

The monitoring unit can provide 520 the obtained image to a first machine learning model that has been trained to determine whether an image likely depicts a plant. The first machine learning model may include, for example, a neural network. The first machine learning model may process the obtained image and generate a first output value. The generated first output value may include a probability that is indicative of the likelihood that the obtained image that was processed by the first machine learning model depicts a plant.

The monitoring unit can receive 530 an output from the first machine learning model that indicates whether the obtained image likely depicts a plant. The output may include the first output value that was generated by the first machine learning model based on processing the obtained image. The first output value may include a probability that is indicative of the likelihood that the obtained image that was processed by the first machine learning model depicts a plant.

If the output from the first machine learning model indicates that it is not likely that the obtained image depicts a plant, then the process ends at stage 532. Alternatively, if the output from the first machine learning model indicates that it is likely that the obtained image depicts a plant, then the monitoring unit can provide 540 the obtained image to a second machine learning model that has been trained to determine whether an image depicts leaves that are likely healthy. The second machine learning model may include, for example, a neural network. The second machine learning model may process the obtained image and generate a second output value. The generated second output value may include a probability that is indicative of the likelihood that the obtained image that was processed by the second machine learning model depicts leaves that are likely healthy.

The monitoring unit can receive 550 an output from the second machine learning model that indicates whether the obtained image likely depicts leaves that are likely healthy. The output may include the second output value that was generated by the second machine learning model based on processing the obtained image. The second output value may include a probability that is indicative of the likelihood that the obtained image that was processed by the second machine learning model depicts a leaves that are likely healthy.

If the output from the second machine learning model indicates that it is not likely that the obtained image depicts healthy leaves, then the monitoring unit can determine 552 that the plant depicted by the obtained image needs water. Based on the determination 552 that the plant depicted by the obtained image needs water, the monitoring unit can perform 554 one or more operations to initiate watering of the plant depicted by the obtained image. For example, the monitoring unit may transmit an alert to a user device that notifies the user device that the plant depicted by the image needs water. Alternatively, the monitoring unit may transmit an instruction to a drone that is equipped with a water tank and a sprayer to navigate to the location of the plant and water the plant. In either example, the monitoring unit may determine the location of the plant that needs watering based on the obtained image, metadata associated with the obtained image, the location of the camera that captured the obtained image, a stored map of plant locations, or a combination thereof. After initiating watering of the plant depicted by the obtained image, the process 500 continues to stage 560.

Alternatively, if the output from the second machine learning model indicates that it is likely that the obtained image depicts leaves that are healthy, then the monitoring unit can provide 560 the obtained image to a third machine learning model that has been trained to determine whether an image depicts an item that is ripe for picking. The third machine learning model may include, for example, a neural network. The third machine learning model may process the obtained image and generate a third output value. The generated third output value may include a probability that is indicative of the likelihood that the obtained image that was processed by the third machine learning model depicts an item that is ripe for picking. The item may include a leaf, a vegetable, a fruit, or a combination thereof.

The monitoring unit can receive 570 an output from the third machine learning model that indicates whether the obtained imager likely includes an item that is ripe for picking. The output may include the third output value that was generated by the third machine learning model based on processing the obtained image. The third output value may include a probability that is indicative of the likelihood that the obtained image that was processed by the third machine learning model depicts an item that is ripe for picking.

If the output of the third machine learning model indicates that it is not likely that the obtained image depicts an item that is ripe for picking, then the process ends at stage 572. Alternatively, if the output of the third machine learning model indicates that it is likely that the obtained image depicts an item that is ripe for picking, then the monitoring unit can perform 580 one or more operations to initiate picking of the item that is ripe for picking. For example, the monitoring unit can transmit a notification to a user device that alerts a user that the plant depicted by the image has an item that is ripe for picking. The monitoring unit may determine the location of the plant that needs watering based on the obtained image, metadata associated with the obtained image, the location of the camera that captured the obtained image, a stored map of plant locations, or a combination thereof.

The example process 500 described with respect to FIG. 5 describes how multiple machine learning models can be used by a monitoring system in series, and in a particular order, to assist with indoor gardening. However, the present disclosure need not limited to this single exemplary process set forth in FIG. 5. For example, one or more of the machine learning models described with reference to FIG. 5 may be used in a different order. Alternatively, or in addition, for example, the process can continue directly on to stage 560 from stage 550 after determining that the leaves are not healthy and need watering. That is, it is not required to perform one or more watering operations before using a machine learning model to predict whether a plant depicted in an image or video is likely ripe (or will likely be ripe within a given period of time). Alternatively, or in addition, one or more of the machine learning models may process input data (e.g., images, video, or the like) in parallel. Alternatively, or in addition, other types of machine learning models may be used. For example, in some implementations, a machine learning model that has been trained to determine whether an image depicts an item that will be ripe for picking within a given amount of time.

Figure 6:
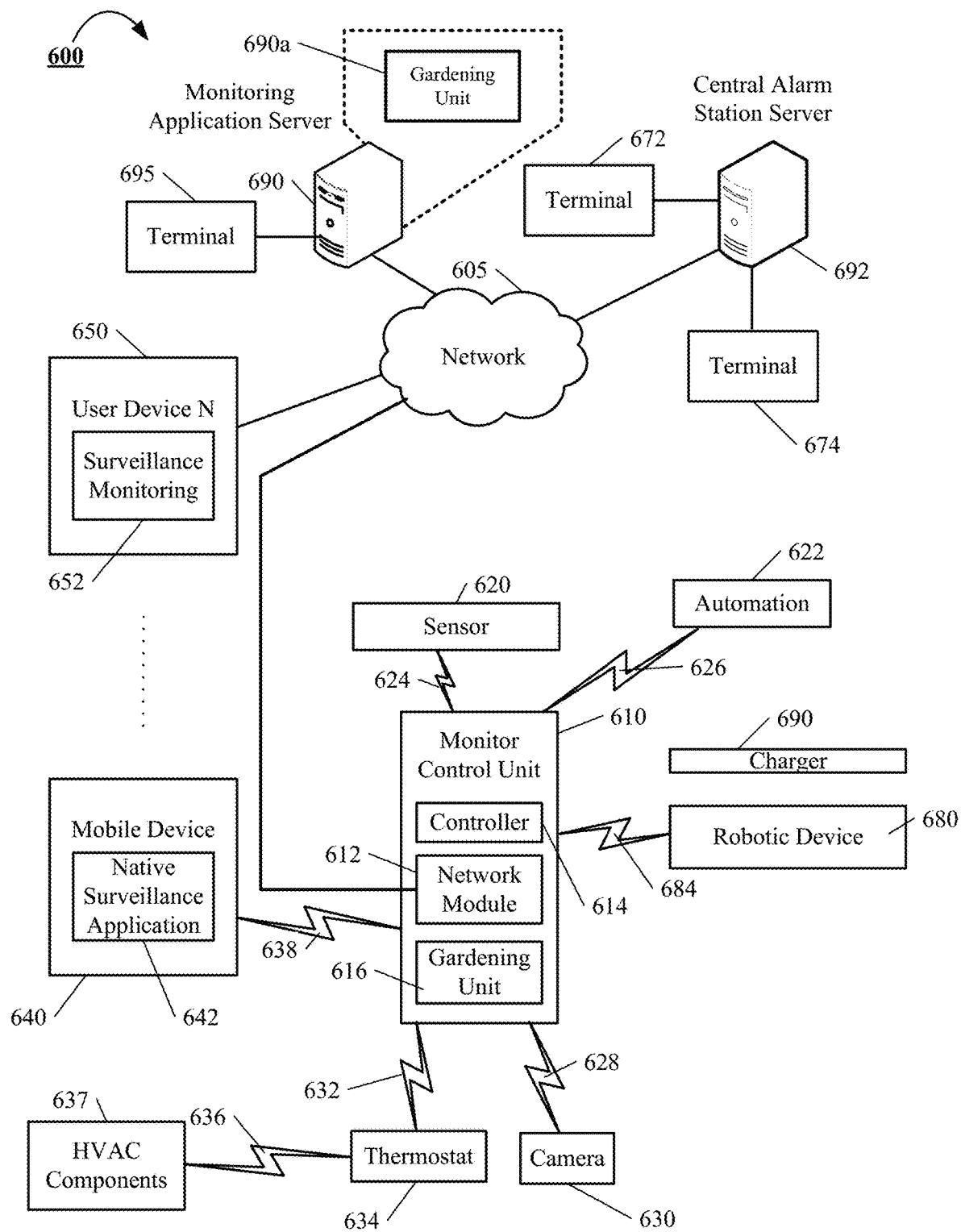
FIG. 6 is a block diagram of components that can be used to implement a monitoring system that assists with indoor gardening.

FIG. 6 is a block diagram of components that can be used to implement a monitoring system that assists with indoor gardening.

The electronic system 600 includes a network 605, a monitoring system control unit 610, one or more user devices 640, 650, a monitoring application server 690, and a central alarm station server 692. In some examples, the network 605 facilitates communications between the monitoring system control unit 610, the one or more user devices 640, 650, the monitoring application server 690, and the central alarm station server 692.

The network 605 is configured to enable exchange of electronic communications between devices connected to the network 605. For example, the network 605 may be configured to enable exchange of electronic communications between the monitoring system control unit 610, the one or more user devices 640, 650, the monitoring application server 690, and the central alarm station server 692. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The monitoring system control unit 610 includes a controller 612 and a network module 614. The controller 612 is configured to control a monitoring system (e.g., a home alarm or security system) that includes the monitoring system control unit 610. In some examples, the controller 612 may include a processor or other control circuitry configured to execute instructions of a program that controls operation of an alarm system. In these examples, the controller 612 may be configured to receive input from sensors, detectors, or other devices included in the alarm system and control operations of devices included in the alarm system or other household devices (e.g., a thermostat, an appliance, lights, etc.). For example, the controller 612 may be configured to control operation of the network module 614 included in the monitoring system control unit 610.

The monitoring system control unit 610 may also include a gardening unit 616. The gardening unit 616 may include a software code stored in a memory unit that, when executed by the processor (or other control circuitry) of the monitoring system control unit 610 realizes programmed functionality that performs the operations described with reference to FIGS. 1-5. For example, the gardening unit 616 may be configured to receive a query that identifier a plant type and then determine one or more suitable zones within a property that have an environment that is suitable for growing the plant type. Alternatively, or in addition, the gardening unit 616 can be configured to monitoring and maintain plants that are already "known" to be growing in the property. For example, the garden unit 616 can access plant data stored in a local plant database, a remote plant database, or both, obtain sensor data from one or more zones of a property, and monitor the growth of plants growing in the property based on the accessed plant data and the obtained sensor data. In some implementations, the garden monitoring unit 616 can use a series of machine learning models, image analytics, video analytics, or a combination thereof, to monitor plant growth, plant health, plant harvesting, or a combination thereof. The gardening unit 616 can generate one or more notifications that the monitoring system control unit can transmit to a user to alert the user about plant growth in the property. Alternatively, or in addition, the gardening unit 616 can generate one or more instructions for transmission by the monitoring system control unit 610 to another component of a monitoring system such as a robotic device 680, a camera 630, an HVAC 537, a Thermostat 634, one or more lighting units, one or more connected blinds, humidifier unit, a dehumidifier unit, or a combination thereof, to instruct one or more of respective components to perform one or more operations described herein with respect to monitoring or maintaining plant growth in the property.

In some implementations, the gardening unit 616 may instead be hosted by the monitoring application server 690 as a gardening unit 690a. In such instances, the monitoring application server 690 is configured to perform each of the operations described with reference to FIGS. 1-5. In yet other implementations, the monitoring application server 690 and the monitoring system control unit 610 may each host the gardening unit 690a, 616, respectively. In such instances, one or more of the operations described with reference to FIGS. 1-5 may be performed by the monitoring application server 690 and one or more of the operations described with reference to FIGS. 1-5 may be performed by the monitoring system control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the monitoring system control unit 610 to communicate over a local area network and/or the Internet. The network module 614 also may be a voiceband modem configured to enable the alarm panel to communicate over the telephone lines of Plain Old Telephone Systems (POTS).

The monitoring system that includes the monitoring system control unit 610 includes at least one sensor (or detector) 620. The sensor 620 may include a contact sensor, a motion sensor, a glass break sensor, or any other type of sensor included in an alarm system or security system. The sensor 620 may also include an environmental sensor, such as a temperature sensor, a water sensor, a rain sensor, a wind sensor, a light sensor, a smoke detector, a carbon monoxide detector, an air quality sensor, etc. The sensor 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensor 620 may include a radio-frequency identification (RFID) sensor that identifies a particular article that includes a pre-assigned RFID tag. Each respective type of sensor (or detector) 620 is configured to generate data which can be used to detect a potential event at a property.

The monitoring system control unit 610 communicates with the module 625 and the camera 630 to perform surveillance or monitoring. The module 625 is connected to one or more devices that enable home automation control. For instance, the module 625 may be connected to one or more lighting systems and may be configured to control operation of the one or more lighting systems. Also, the module 625 may be connected to one or more electronic locks at the property and may be configured to control operation of the one or more electronic locks (e.g., control Z-Wave locks using wireless communications in the Z-Wave protocol. Further, the module 625 may be connected to one or more appliances at the property and may be configured to control operation of the one or more appliances. The module 625 may include multiple modules that are each specific to the type of device being controlled in an automated manner. The module 625 may control the one or more devices based on commands received from the monitoring system control unit 610. For instance, the module 625 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building monitored by the monitoring system control unit 610. The camera 630 may be configured to capture single, static images of the area and also video images of the area in which multiple images of the area are captured at a relatively high frequency (e.g., thirty images per second). The camera 630 may be controlled based on commands received from the monitoring system control unit 610.

The camera 630 may be triggered by several different types of techniques. For instance, a Passive Infra Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensor 620, PIR, door/window, etc.) detect motion or other events. In some implementations, the camera 630 receives a command to capture an image when external devices detect motion or another potential alarm event. The camera 630 may receive the command from the controller 612 or directly from one of the sensor 620.

In some examples, the camera 630 triggers integrated or external illuminators (e.g., Infra Red, Z-Wave controlled "white" lights, lights controlled by the module 625, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the monitoring system control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 690 over the Internet. In these implementations, image data captured by the camera 630 does not pass through the monitoring system control unit 610 and the camera 630 receives commands related to operation from the monitoring application server 690.

The system 600 also includes a thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the monitoring system control unit 610 and can control the environmental (e.g., temperature) settings based on commands received from the monitoring system control unit 610.

In some implementations, the thermostat 634 is a dynamically programmable thermostat and can be integrated with the monitoring system control unit 610. For example, the dynamically programmable thermostat 634 can include the monitoring system control unit 610, e.g., as an internal component to the dynamically programmable thermostat 634. In addition, the monitoring system control unit 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

The system 600 further includes one or more robotic devices 680. The robotic device 680 may be any type of robot that is capable of moving and taking actions that assist in security monitoring. For example, the robotic device 680 may include a drone that is capable of moving throughout a property based on automated control technology and/or user input control provided by a user. In this example, the drone may be able to fly, roll, walk, or otherwise move about the property. The drone may include a helicopter type device (e.g., a quad copter), rolling helicopter type device (e.g., a roller copter device that can fly and also roll along the ground, walls, or ceiling) and a land vehicle type device (e.g., an automated car that drives around a property). In some cases, the robotic device 680 may be a robotic device that is intended for other purposes and is merely associated with the monitoring system 600 for use in appropriate circumstances. For instance, a robotic vacuum cleaner device may be associated with the monitoring system 600 as one of the robotic devices 680 and may be controlled to take action responsive to monitoring system events.

In some examples, the robotic device 680 may automatically navigate within a property. In these examples, the robotic device 680 may include sensors and control processors that guide movement of the robotic device 680 within the property. For instance, the robotic device 680 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic device 680 may include control processors that process output from the various sensors and control the robotic device 680 to move along a path that reaches the desired destination and avoids obstacles. In this regard, the control processors detect walls or other obstacles in the property and guide movement of the robotic device 680 in a manner that avoids the walls and other obstacles.

In addition, the robotic device 680 may store data that describes attributes of the property. For instance, the robotic device 680 may store a floorplan and/or a three-dimensional model of the property that enables the robotic device 680 to navigate the property. During initial configuration, the robotic device 680 may receive the data describing attributes of the property, determine a frame of reference to the data (e.g., a home or reference location in the property), and navigate the property based on the frame of reference and the data describing attributes of the property. Further, initial configuration of the robotic device 680 also may include learning of one or more navigation patterns in which a user provides input to control the robotic device 680 to perform a specific navigation action (e.g., fly to an upstairs bedroom and spin around while capturing video and then return to a home charging base). In this regard, the robotic device 680 may learn and store the navigation patterns such that the robotic device 680 may automatically repeat the specific navigation actions upon a later request.

In some examples, the robotic device 680 may include data capture and recording devices. In these examples, the robotic device 680 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic device 680 to take and store a biometric sample that can be used to identify the person (e.g., a biometric sample with DNA that can be used for DNA testing).

In some implementations, the robotic device 680 may include one or more output devices. In these implementations, the robotic device 680 may include one or more displays, one or more speakers, one or more projectors, and/or any type of output devices that allow the robotic device 680 to communicate information to a nearby user. The one or more projectors may include projectors that project a two-dimensional image onto a surface (e.g., wall, floor, or ceiling) and/or holographic projectors that project three-dimensional holograms into a nearby space.

The robotic device 680 also may include a communication module that enables the robotic device 680 to communicate with the monitoring system control unit 610, each other, and/or other devices. The communication module may be a wireless communication module that allows the robotic device 680 to communicate wirelessly. For instance, the communication module may be a Wi-Fi module that enables the robotic device 680 to communicate over a local wireless network at the property. The communication module may further may be a 600 MHz wireless communication module that enables the robotic device 680 to communicate directly with the monitoring system control unit 610. Other types of short-range wireless communication protocols, such as Bluetooth, Bluetooth LE, Zwave, ZigBee, etc., may be used to allow the robotic device 680 to communicate with other devices in the property.

The robotic device 680 further may include processor and storage capabilities. The robotic device 680 may include any suitable processing devices that enable the robotic device 680 to operate applications and perform the actions described throughout this disclosure. In addition, the robotic device 680 may include solid state electronic storage that enables the robotic device 680 to store applications, configuration data, collected sensor data, and/or any other type of information available to the robotic device 680.

The robotic device 680 is associated with a charging station 690. The charging stations 690 may be located at predefined home base or reference locations in the property. The robotic device 680 may be configured to navigate to the charging station 690 after completion of tasks needed to be performed for the monitoring system 600. For instance, after completion of an investigation of a potential jamming event or upon instruction by the monitoring system control unit 610, the robotic device 680 may be configured to automatically fly to and land on a charging station 690. In this regard, the robotic device 680 may automatically maintain a fully charged battery in a state in which the robotic device 680 are ready for use by the monitoring system 600.

The charging station 690 may be contact based charging stations and/or wireless charging stations. For contact based charging stations, the robotic device 680 may have readily accessible points of contact that the robotic device 680 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic device 680 may charge through a wireless exchange of power. In these cases, the robotic device 680 need only locate itself closely enough to the wireless charging stations for the wireless exchange of power to occur. In this regard, the positioning needed to land at a predefined home base or reference location in the property may be less precise than with a contact based charging station. Based on the robotic device 680 landing at a wireless charging station, the wireless charging station outputs a wireless signal that the robotic device 680 receives and converts to a power signal that charges a battery maintained on the robotic device 680.

The sensor 620, the module 625, the camera 630, the thermostat 634, and the robotic device 680 can communicate with the controller 612 over communication links 627, 626, 628, 632, 638, and 684. The communication links 627, 626, 628, 632, 638, and 684 may be a wired or wireless data pathway configured to transmit signals from the sensor 620, the module 625, the camera 630, the thermostat 634, and the robotic device 680 to the controller 612. The sensor 620, the module 625, the camera 630, the thermostat 634, and the robotic device 680 may continuously transmit sensed values to the controller 612, periodically transmit sensed values to the controller 612, or transmit sensed values to the controller 612 in response to a change in a sensed value.

The communication links 627, 626, 628, 632, 638, and 684 may include a local network. The sensor 620, the module 625, the camera 630, the thermostat 634, the robotic device 680, and the controller 612 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 6 (CAT5) or Category 6 (CAT6) wired Ethernet network. The local network may be a mesh network constructed based on the devices connected to the mesh network.

The monitoring application server 690 is an electronic device configured to provide monitoring services by exchanging electronic communications with the monitoring system control unit 610, the one or more user devices 640, 650, and the central alarm station server 692 over the network 605. For example, the monitoring application server 690 may be configured to monitor events (e.g., alarm events) generated by the monitoring system control unit 610. In this example, the monitoring application server 690 may exchange electronic communications with the network module 614 included in the monitoring system control unit 610 to receive information regarding events (e.g., alarm events) detected by the monitoring system control unit 610. The monitoring application server 690 also may receive information regarding events (e.g., alarm events) from the one or more user devices 640, 650.

In some examples, the monitoring application server 690 may route alarm data received from the network module 614 or the one or more user devices 640, 650 to the central alarm station server 692. For example, the monitoring application server 690 may transmit the alarm data to the central alarm station server 692 over the network 605.

The monitoring application server 690 may store sensor and image data received from the monitoring system and perform analysis of sensor and image data received from the monitoring system. Based on the analysis, the monitoring application server 690 may communicate with and control aspects of the monitoring system control unit 610 or the one or more user devices 640, 650.

The central alarm station server 692 is an electronic device configured to provide alarm monitoring service by exchanging communications with the monitoring system control unit 610, the one or more mobile devices 640, 650, and the monitoring application server 690 over the network 605. For example, the central alarm station server 692 may be configured to monitor alarm events generated by the monitoring system control unit 610. In this example, the central alarm station server 692 may exchange communications with the network module 614 included in the monitoring system control unit 610 to receive information regarding alarm events detected by the monitoring system control unit 610. The central alarm station server 692 also may receive information regarding alarm events from the one or more mobile devices 640, 650 and/or the monitoring application server 690.

The central alarm station server 692 is connected to multiple terminals 672 and 674. The terminals 672 and 674 may be used by operators to process alarm events. For example, the central alarm station server 692 may route alarm data to the terminals 672 and 674 to enable an operator to process the alarm data. The terminals 672 and 674 may include general-purpose computers (e.g., desktop personal computers, workstations, or laptop computers) that are configured to receive alarm data from a server in the central alarm station server 692 and render a display of information based on the alarm data. For instance, the controller 612 may control the network module 614 to transmit, to the central alarm station server 692, alarm data indicating that a sensor 620 detected a door opening when the monitoring system was armed. The central alarm station server 692 may receive the alarm data and route the alarm data to the terminal 672 for processing by an operator associated with the terminal 672. The terminal 672 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640, 650 are devices that host and display user interfaces. For instance, the user device 640 is a mobile device that hosts one or more native applications (e.g., the native surveillance application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a native surveillance application 642. The native surveillance application 642 refers to a software/firmware program running on the corresponding mobile device that enables the user interface and features described throughout. The user device 640 may load or install the native surveillance application 642 based on data received over a network or data received from local media. The native surveillance application 642 runs on mobile devices platforms, such as iPhone, iPod touch, Blackberry, Google Android, Windows Mobile, etc. The native surveillance application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 690 and/or the monitoring system control unit 610 over the network 605. The user device 650 may be configured to display a surveillance monitoring user interface 652 that is generated by the user device 650 or generated by the monitoring application server 690. For example, the user device 650 may be configured to display a user interface (e.g., a web page) provided by the monitoring application server 690 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640, 650 communicate with and receive monitoring system data from the monitoring system control unit 610 using the communication link 638. For instance, the one or more user devices 640, 650 may communicate with the monitoring system control unit 610 using various local wireless protocols such as Wi-Fi, Bluetooth, Z-Wave, ZigBee, HomePlug (Ethernet over powerline), or wired protocols such as Ethernet and USB, to connect the one or more user devices 640, 650 to local security and automation equipment. The one or more user devices 640, 650 may connect locally to the monitoring system and its sensors and other devices. The local connection may improve the speed of status and control communications because communicating through the network 605 with a remote server (e.g., the monitoring application server 690) may be significantly slower.

Although the one or more user devices 640, 650 are shown as communicating with the monitoring system control unit 610, the one or more user devices 640, 650 may communicate directly with the sensors and other devices controlled by the monitoring system control unit 610. In some implementations, the one or more user devices 640, 650 replace the monitoring system control unit 610 and perform the functions of the monitoring system control unit 610 for local monitoring and long range/offsite communication.

In other implementations, the one or more user devices 640, 650 receive monitoring system data captured by the monitoring system control unit 610 through the network 605. The one or more user devices 640, 650 may receive the data from the monitoring system control unit 610 through the network 605 or the monitoring application server 690 may relay data received from the monitoring system control unit 610 to the one or more user devices 640, 650 through the network 605. In this regard, the monitoring application server 690 may facilitate communication between the one or more user devices 640, 650 and the monitoring system.

In some implementations, the one or more user devices 640, 650 may be configured to switch whether the one or more user devices 640, 650 communicate with the monitoring system control unit 610 directly (e.g., through link 638) or through the monitoring application server 690 (e.g., through network 605) based on a location of the one or more user devices 640, 650. For instance, when the one or more user devices 640, 650 are located close to the monitoring system control unit 610 and in range to communicate directly with the monitoring system control unit 610, the one or more user devices 640, 650 use direct communication. When the one or more user devices 640, 650 are located far from the monitoring system control unit 610 and not in range to communicate directly with the monitoring system control unit 610, the one or more user devices 640, 650 use communication through the monitoring application server 690.

Although the one or more user devices 640, 650 are shown as being connected to the network 605, in some implementations, the one or more user devices 640, 650 are not connected to the network 605. In these implementations, the one or more user devices 640, 650 communicate directly with one or more of the monitoring system components and no network (e.g., Internet) connection or reliance on remote servers is needed.

In some implementations, the one or more user devices 640, 650 are used in conjunction with only local sensors and/or local devices in a house. In these implementations, the system 600 only includes the one or more user devices 640, 650, the sensor 620, the module 625, the camera 630, and the robotic device 680. The one or more user devices 640, 650 receive data directly from the sensor 620, the module 625, the camera 630, and the robotic device 680 and sends data directly to the sensor 620, the module 625, the camera 630, and the robotic device 680. The one or more user devices 640, 650 provide the appropriate interfaces/processing to provide visual surveillance and reporting.

In other implementations, the system 600 further includes network 605 and the sensor 620, the module 625, the camera 630, the thermostat 634, the robotic device 680, and the homes assistant 696 are configured to communicate sensor and image data to the one or more user devices 640, 650 over network 605 (e.g., the Internet, cellular network, etc.). In yet another implementation, the sensor 620, the module 625, the camera 630, the thermostat 634, the robotic device 680 (or a component, such as a bridge/router) are intelligent enough to change the communication pathway from a direct local pathway when the one or more user devices 640, 650 are in close physical proximity to the sensor 620, the module 625, the camera 630, the thermostat 634, and the robotic device 680 to a pathway over network 605 when the one or more user devices 640, 650 are farther from the sensor 620, the module 625, the camera 630, the thermostat 634, and the robotic device 680. In some examples, the system leverages GPS information from the one or more user devices 640, 650 to determine whether the one or more user devices 640, 650 are close enough to the sensor 620, the module 625, the camera 630, the thermostat 634, the robotic device 680 to use the direct local pathway or whether the one or more user devices 640, 650 are far enough from the sensor 620, the module 625, the camera 630, the thermostat 634, and the robotic device 680 that the pathway over network 605 is required. In other examples, the system leverages status communications (e.g., pinging) between the one or more user devices 640, 650 and the sensor 620, the module 625, the camera 630, the thermostat 634, the robotic device 680 to determine whether communication using the direct local pathway is possible. If communication using the direct local pathway is possible, the one or more user devices 640, 650 communicate with the sensor 620, the module 625, the camera 630, the thermostat 634, and the robotic device 680 using the direct local pathway. If communication using the direct local pathway is not possible, the one or more user devices 640, 650 communicate with the sensor 620, the module 625, the camera 630, the thermostat 634, and the robotic device 680 using the pathway over network 605.

The invention claimed is:
1. A monitoring system comprising:
one or more processors; and one or more computer storage media storing instructions that are operable, when executed by the one or more processors, to cause the one or more processors to perform operations comprising:

determining, by the monitoring system, that a particular plant type is growing in a particular property zone of a plurality of property zones;

obtaining, by the monitoring system, sensor data generated by one or more sensors installed at a property, the sensor data indicating a current value of an environmental attribute for the particular property zone;

determining, by the monitoring system and based on the sensor data, whether the current value of the environmental attribute of the particular property zone satisfies a threshold environmental value for the particular plant type; and in response to determining, by the monitoring system, that the current value of the environmental attribute of the particular property zone does not satisfy the threshold environmental value for the particular plant type, performing, by the monitoring system, one or more operations configured to instruct a configurable device installed at the property to modify the current value of the environmental attribute of the particular property zone towards the threshold environmental value for the particular plant type.

2. The monitoring system of claim 1, the operations further comprising:

receiving, by the monitoring system, data from a user of a user device that identifies the particular plant type and the particular property zone; and wherein determining, by the monitoring system, that the particular plant type is growing in the particular property zone comprises:

determining, by the monitoring system and based on the received data from the user of the user device, that the particular plant type is growing in the particular property zone.

3. The monitoring system of claim 1, wherein the monitoring system includes a camera, and wherein determining, by the monitoring system, that the particular plant type is growing in the particular property zone comprises:

obtaining, by the monitoring system, an image of the particular property zone that was generated by the camera; and determining, by the monitoring system and based on the obtained image, that the particular property zone includes the particular plant type.

4. The monitoring system of claim 1, wherein the one or more sensors includes a thermometer, wherein the configurable device includes an HVAC unit, and wherein the operations further comprise:

obtaining, by the monitoring system, a current temperature value for the particular property zone using the thermometer; and obtaining, by the monitoring system, a threshold environmental value for the particular plant type that describes a minimum temperature value that provides a suitable environment for growing the particular plant type;

wherein determining whether the current value of the environmental attribute of the particular property zone satisfies a threshold environmental value for the particular plant type comprises:

determining, by the monitoring system, that the current temperature value for the particular property zone has fallen below the minimum temperature value; and wherein performing, by the monitoring system, one or more operations configured to modify the current value of the environmental attribute of the particular property zone towards the threshold environmental value for the particular plant type comprises:

instructing, by the monitoring system, the HVAC unit to adjust the temperature of the particular property zone until the current temperature value of the particular property zone exceeds the minimum temperature.

5. The system of claim 1, wherein the one or more sensors includes a thermometer, wherein the configurable device includes an HVAC unit, and wherein the operations further comprise:

obtaining, by the monitoring system, a current temperature value for the particular property zone using the thermometer; and obtaining, by the monitoring system, a threshold environmental value for the particular plant type that describes a maximum temperature value that provide a suitable environment for growing the particular plant type;

wherein determining whether the current value of the environmental attribute of the particular property zone satisfies a threshold environmental value for the particular plant type comprises:

determining, by the monitoring system, that the current temperature value for the particular property zone has exceeded the maximum temperature value; and wherein performing, by the monitoring system, one or more operations configured to modify the current value of the environmental attribute of the particular property zone towards the threshold environmental value for the particular plant type comprises:

instructing, by the monitoring system, the HVAC unit to adjust the temperature of the particular property zone until the current temperature value of the particular property zone falls below the maximum temperature.

6. The monitoring system of claim 1, wherein the one or more sensors includes a hygrometer, wherein the configurable device includes a humidification unit, and wherein the operations further comprise:

obtaining, by the monitoring system, a current humidity value for the particular property zone using the hygrometer; and obtaining, by the monitoring system, a threshold environmental value for the particular plant type that describes a minimum humidity value that provides a suitable environment for growing the particular plant type;

wherein determining whether the current value of the environmental attribute of the particular property zone satisfies a threshold environmental value for the particular plant type comprises:

determining, by the monitoring system, that the current humidity value for the particular property zone has fallen below the minimum humidity value; and wherein performing, by the monitoring system, one or more operations configured to modify the current value of the environmental attribute of the particular property zone towards the threshold environmental value for the particular plant type comprises:
　　instructing, by the monitoring system, the humidification unit to adjust the humidity of the particular property zone until the current humidity value exceeds the minimum humidity value.

7. The monitoring system of claim 1,
wherein the one or more sensors includes a hygrometer,
wherein the configurable device includes a de-humidification unit, and
wherein the operations further comprise:
　　obtaining, by the monitoring system, a current humidity value for the particular property zone using the hygrometer; and
　　obtaining, by the monitoring system, a threshold environmental value for the particular plant type that describes a maximum humidity value that provides a suitable environment for growing the particular plant type;
wherein determining whether the current value of the environmental attribute of the particular property zone satisfies a threshold environmental value for the particular plant type comprises:
　　determining, by the monitoring system, that the current humidity value for the particular property zone has exceeded the maximum humidity value; and
wherein performing, by the monitoring system, one or more operations configured to modify the current value of the environmental attribute of the particular property zone towards the threshold environmental value for the particular plant type comprises:
　　instructing, by the monitoring system, the de-humidification unit to adjust the humidity of the particular property zone until the current humidity value falls below the maximum humidity value.

8. The monitoring system of claim 1,
wherein the one or more sensors includes a light sensor,
wherein the configurable device includes a set of connected blinds, and
wherein the operations further comprise:
　　obtaining, by the monitoring system, a current sunlight value for the particular property zone using the light sensor, wherein the sunlight value indicates a number of hours light has been detected in the zone; and
　　obtaining, by the monitoring system, a threshold environmental value for the particular plant type that describes a minimum number of hours of sunlight that provides a suitable environment for growing the particular plant type;
wherein determining whether the current value of the environmental attribute of the particular property zone satisfies a threshold environmental value for the particular plant type comprises:
　　determining, by the monitoring system, that the current sunlight value for the particular property zone does not satisfy the minimum number of hours; and
wherein performing, by the monitoring system, one or more operations configured to modify the current value of the environmental attribute of the particular property zone towards the threshold environmental value for the particular plant type comprises:
　　instructing, by the monitoring system, the set of connected blinds to open for a predetermined amount of time to increase the number of hours the particular plant type is exposed to sunlight.

9. The monitoring system of claim 1,
wherein the one or more sensors includes a light sensor,
wherein the configurable device includes a set of connected blinds, and
wherein the operations further comprise:
　　obtaining, by the monitoring system, a current sunlight value for the particular property zone using the light sensor, wherein the sunlight value indicates a number of hours light has been detected in the zone; and
　　obtaining, by the monitoring system, a threshold environmental value for the particular plant type that describes a maximum number of hours of sunlight that provides a suitable environment for growing the particular plant type;
wherein determining whether the current value of the environmental attribute of the particular property zone satisfies a threshold environmental value for the particular plant type comprises:
　　determining, by the monitoring system, that the current sunlight value for the particular property zone exceeds maximum number of hours; and
wherein performing, by the monitoring system, one or more operations configured to modify the current value of the environmental attribute of the particular property zone towards the threshold environmental value for the particular plant type comprises:
　　instructing, by the monitoring system, the set of connected blinds to close for a predetermined amount of time to reduce the number of hours the particular plant type is exposed to sunlight.

10. The monitoring system of claim 1,
wherein the one or more sensors includes a thermometer,
wherein the configurable device includes a set of connected blinds, and
wherein the operations further comprise:
　　obtaining, by the monitoring system, a current temperature value for the particular property zone using the thermometer; and
　　obtaining, by the monitoring system, a threshold environmental value for the particular plant type that describes a maximum temperature that provides a suitable environment for growing the particular plant type;
wherein determining whether the current value of the environmental attribute of the particular property zone satisfies a threshold environmental value for the particular plant type comprises:
　　determining, by the monitoring system, that the current temperature value for the particular property zone exceeds the maximum temperature value; and
wherein performing, by the monitoring system, one or more operations configured to modify the current value of the environmental attribute of the particular property zone towards the threshold environmental value for the particular plant type comprises:
　　instructing, by the monitoring system, the set of connected blinds to close to create a shaded environment.

11. The monitoring system of claim 1, wherein the plant type comprises a taxonomic plant type.

12. The monitoring system of claim 1, wherein the particular property zone comprises a first property zone and the particular plant type comprises a first plant type, the operations comprising:

determining, by the monitoring system, that a second plant type is growing in a second property zone of the plurality of property zones, the second plant type being different from the first plant type;

obtaining, by the monitoring system, second sensor data generated by one or more sensors installed at the property, the second sensor data indicating a respective current value of the environmental attribute for the second property zone;

determining, by the monitoring system and based on the second sensor data, whether the current value of the environmental attribute of the second property zone satisfies a threshold environmental value for the second plant type; and in response to determining, by the monitoring system, that the current value of the environmental attribute of the second property zone satisfies the threshold environmental value for the second plant type, determining, by the monitoring system, not to perform an operation configured to instruct a configurable device installed at the property to modify the current value of the environmental attribute of the second property zone.

13. A monitoring system comprising:
one or more processors; and
one or more computer storage media storing instructions that are operable, when executed by the one or more processors, to cause the one or more processors to perform operations comprising:
    obtaining, by the monitoring system, first data describing a respective current value of an attribute for each property zone of a plurality of property zones from one or more monitoring system components installed at the property;
    obtaining, by the monitoring system, second data describing a respective value of a plant attribute for each of a plurality of plant types;
    determining, by the monitoring system and based on (i) the obtained first data describing the respective current value of the attribute for each property zone and (ii) the obtained second data describing the respective values of a plant attribute for each of the plurality of plant types, whether each property zone provides a suitable environment for growing a particular plant type of the plurality of plant types; and
    based on determining whether each property zone provides a suitable environment for growing the particular plant type:
        generating a message, for transmission to a user device, that recommends placement of the particular plant type in at least one property zone.

14. The monitoring system of claim 13,
wherein the second data describing respective values of the plant attribute for each plant type of the plurality of plant types includes a threshold environmental value for each of the plurality of plant types, and
wherein the threshold environmental value specifies a maximum value, a minimal value, or range of values that must be satisfied for the plant type associated with the threshold environmental value to grow.

15. The monitoring system of claim 13, wherein the plant attribute includes one of a temperature, a humidity, an air quality, or object movement.

16. The monitoring system of claim 13, wherein the value of the plant attribute includes a temperature level, a temperature range, a humidity level, a humidity range, an air quality level, an air quality range, a level of movement permitted in a vicinity of the plant type, or a range of movement permitted in a vicinity of the plant type.

17. The monitoring system of claim 13, wherein determining whether each property zone provides a suitable environment for growing the particular plant type of the plurality of plant types comprises:
    for each property zone of the plurality of property zones:
        determining, by the monitoring system and for the particular plant type, whether the current value of the attribute for the property zone satisfies a threshold environmental value for the plant attribute that is defined by the second data.

18. The monitoring system of claim 13, wherein determining whether each property zone provides a suitable environment for growing the particular plant type of the plurality of plant types comprises:
    for each property zone of the plurality of property zones:
        comparing, by the monitoring system, the current value of the attribute for the property zone to the value of the plant attribute for the particular plant type.

19. The monitoring system of claim 13, wherein the generated message includes rendering data that, when rendered using the user device, generates a graphical user interface for output on the user device that identifies, for each property zone having an environment suitable for growing the particular plant type, (i) the particular plant type, and (ii) the property zone.

20. The monitoring system of claim 13, wherein the generated message includes rendering data that, when rendered on the user device, displays a heat map overlay of a map of at least one of the property zones, wherein the rendered heat map includes color-shaded portions of the map of the at least one of the property zones based on a suitability of each portion of the zone for growing the particular plant type.

21. The monitoring system of claim 20, wherein the color-shaded portions of the rendered heat map include a first color indicating portions of the at least one property zone that are suitable for growing the particular plant type and a second color indicating portions of the at least one property zone that are not as suitable for growing the particular plant type as the portions of the at least one property zone that are indicated by the first color.

22. The monitoring system claim 20, wherein the heat map is provided for display in response to a user selection of a graphical element provided for display on the user device when the message is rendered.

23. The monitoring system of claim 20, wherein the map of the at least one of the property zones comprises a view of one or more rooms of the property from a perspective of the ceiling looking towards the floor.

24. A method comprising:
    obtaining, by a monitoring system, first data describing a respective current value of an attribute for each property zone of a plurality of property zones from one or more monitoring system components installed at a property;
    obtaining, by the monitoring system, second data describing a respective value of a plant attribute for each of a plurality of plant types;
    determining, by the monitoring system and based on (i) the obtained first data describing the respective current value of the attribute for each property zone and (ii) the obtained second data describing the respective values of a plant attribute for each of the plurality of plant types, whether each property zone provides a suitable environment for growing a particular plant type of the plurality of plant types; and based on determining whether each property zone provides a suitable environment for growing the particular plant type:

generating a message, for transmission to a user device, that recommends placement of the particular plant type in at least one property zone.

\* \* \* \* \*